US012598653B2

(12) United States Patent (10) Patent No.: US 12,598,653 B2

Lyu et al. (45) Date of Patent: Apr. 7, 2026

(54) METHOD FOR NODE USED FOR WIRELESS COMMUNICATION AND APPARATUS

(71) Applicant: QUECTEL WIRELESS SOLUTIONS CO., LTD., Shanghai (CN)

(72) Inventors: Ling Lyu, Shanghai (CN); Zheng Zhao, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/884,938

(22) Filed: Sep. 13, 2024

(65) Prior Publication Data

US 2025/0220720 A1 Jul. 3, 2025

Related U.S. Application Data

(63) Continuation of application No. PCT/CN2023/143639, filed on Dec. 29, 2023.

(51) Int. Cl.
$H04W\ 74/0833$ (2024.01)

(52) U.S. Cl.
CPC ............................... $H04W\ 74/0833$ (2013.01)

(58) Field of Classification Search
CPC ............. H04W 74/0833; H04W 74/08; H04W 74/004; H04W 74/006
See application file for complete search history.

(56) References Cited

U.S. PATENT DOCUMENTS

| | | | | |
|---|---|---|---|---|
| 2019/0387546 A1* | 12/2019 | Li | ...................... | H04W 74/0808 |
| 2020/0314917 A1* | 10/2020 | Jeon | .................. | H04W 74/0833 |
| 2021/0307078 A1* | 9/2021 | Singh | ................ | H04W 74/0808 |
| 2023/0007702 A1* | 1/2023 | Park | .................. | H04W 74/0833 |
| 2023/0085104 A1* | 3/2023 | Park | .......................... | H04L 1/18 370/329 |
| 2023/0164845 A1* | 5/2023 | Li | ......................... | H04L 1/1854 370/329 |
| 2023/0247675 A1* | 8/2023 | Shen | ................ | H04W 74/0838 370/329 |
| 2023/0276504 A1* | 8/2023 | Kim | .................. | H04W 74/0833 370/329 |
| 2023/0345524 A1 | 10/2023 | Bae et al. | | |

(Continued)

FOREIGN PATENT DOCUMENTS

| | | |
|---|---|---|
| CN | 115516991 | 12/2022 |
| CN | 115942383 A | 4/2023 |

(Continued)

OTHER PUBLICATIONS

International Search Report and Written Opinion in International Appln. No. PCT/CN2023/143639, mailed on Aug. 28, 2024, 13 pages (with English machine translation).
Vivo, "PRACH mask table," 3GPP TSG-RAN WG2 Meeting #102, R2-1807572, Busan, Korea, May 21-May 25, 2018, 4 pages.
3GPP TS 38.321 V17.4.0, "3rd Generation Partnership Project; Technical Specification Group Radio Access Network; NR; Medium Access Control (MAC) protocol specification (Release 17)," Mar. 2023, 250 pages.

(Continued)

*Primary Examiner* — Chuong M Nguyen

(74) *Attorney, Agent, or Firm* — Fish & Richardson P.C.

(57) ABSTRACT

A method for wireless communication and an apparatus are provided. One example method includes: transmitting a first physical random access channel (PRACH) transmission on a first PRACH occasion (RO) set, wherein a first time offset is a time offset between each two successive RO sets in the plurality of RO sets; and determining a start RO in the first RO set based at least in part on whether the first time offset is configured.

20 Claims, 6 Drawing Sheets

(56)　　　　　　　References Cited

U.S. PATENT DOCUMENTS

2024/0032107 A1 * 1/2024 Cozzo ............... H04W 74/0891
2024/0032108 A1 * 1/2024 Marcone ............ H04W 56/001

FOREIGN PATENT DOCUMENTS

CN            116073967 A      5/2023
CN            116112131        5/2023
CN            116347648        6/2023
CN            116963305 A     10/2023
GB            202210646        9/2022
WO     WO 2023055685 A1      4/2023

OTHER PUBLICATIONS

3GPP TS 38.331 V17.4.0, "3rd Generation Partnership Project; Technical Specification Group Radio Access Network; NR; Radio Resource Control (RRC) protocol specification (Release 17)," Mar. 2023, 1323 pages.
China Telecom, "Revised WID on Further NR coverage enhancements," 3GPP TSG RAN Meeting #96, RP-221858, Budapest, Hungary, Jun. 6-9, 2022, 5 pages.
Moderator (Ericsson), "Feature lead summary#3 on timing relationship enhancements," 3GPP TSG-RAN WG1 Meeting #104-e, R1-2102019, e-Meeting, Jan. 25-Feb. 5, 2021, 95 pages.
Office Action in Chinese Appln. No. 202380012934.4, mailed on Nov. 16, 2024, 42 pages (with machine English translation).

* cited by examiner

100

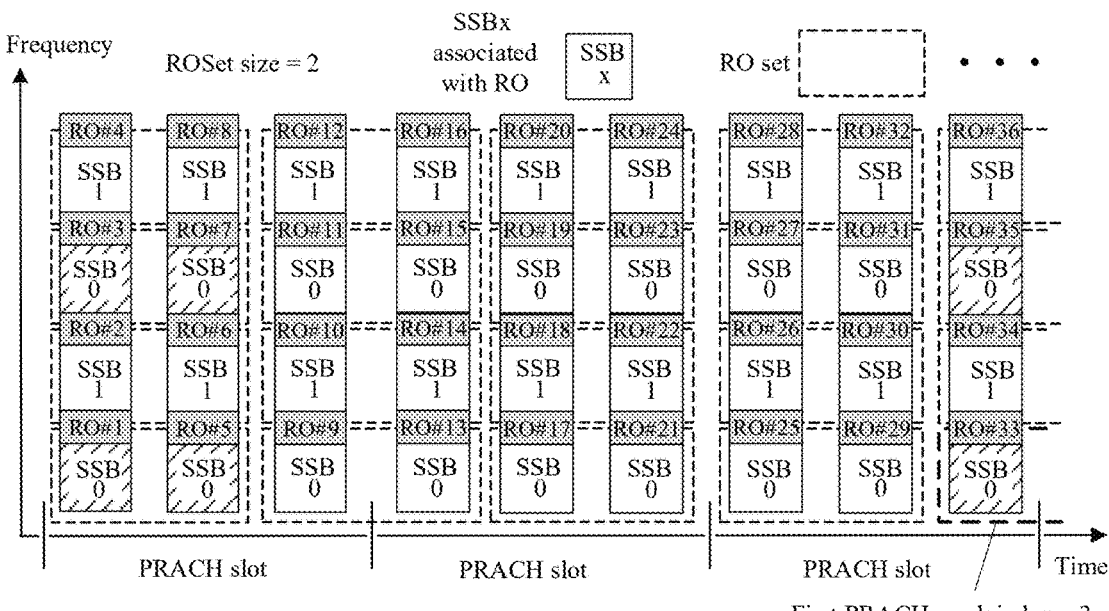
FIG. 10
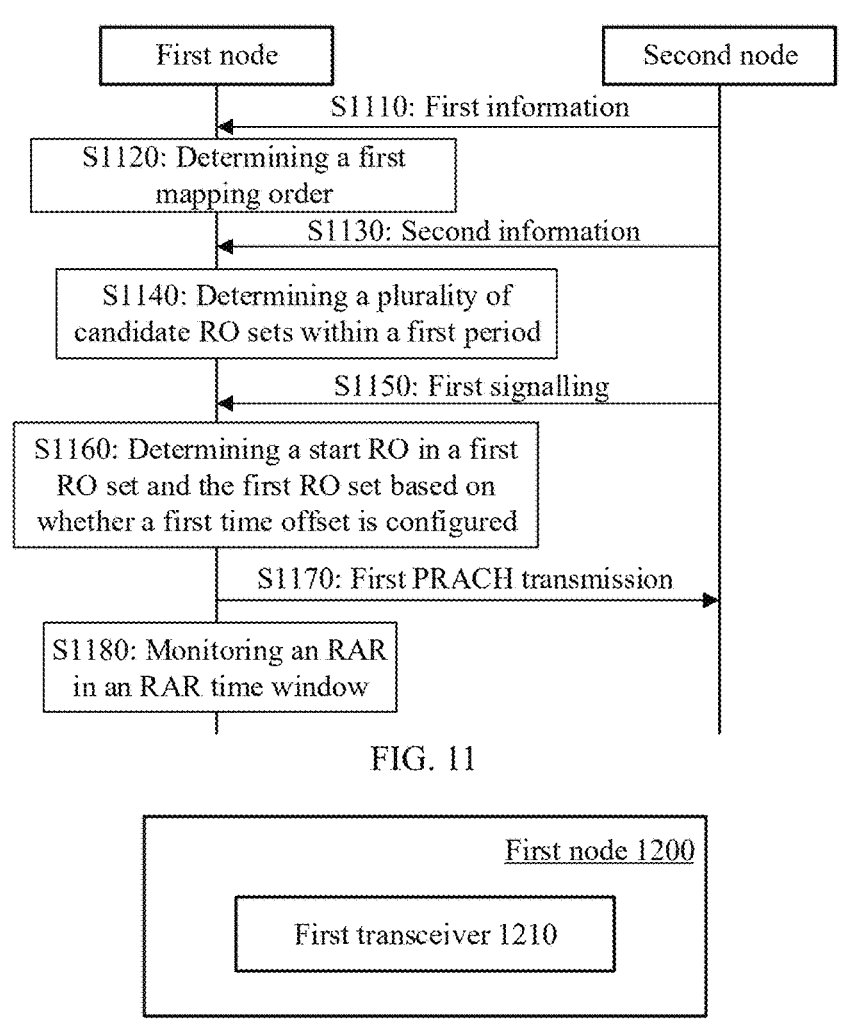
FIG. 11
First node 1200
First transceiver 1210
FIG. 12

METHOD FOR NODE USED FOR WIRELESS COMMUNICATION AND APPARATUS

CROSS-REFERENCE TO RELATED APPLICATIONS

This application is a continuation of International Application No. PCT/CN2023/143639, filed on Dec. 29, 2023, the disclosure of which is hereby incorporated by reference in its entirety.

TECHNICAL FIELD

The present application relates to the field of communications technologies, and more specifically, to a method for a node used for wireless communication and an apparatus.

BACKGROUND

In order to enhance coverage performance of random access, a physical random access channel (PRACH) transmission with a plurality of preamble repetitions is planned to be introduced in some communications systems (for example, a new radio (NR) system). In some random access (for example, contention-free random access (CFRA)) mechanisms, a start PRACH occasion (RO) in a PRACH occasion set (ROSet, also referred to as an RO set) occupied by a plurality of preamble repetitions is generally determined based on a PRACH mask index, so as to determine the PRACH occasion set.

However, not all RO sets can be indicated by the PRACH mask index. In addition, the RO set indicated by the PRACH mask index may conflict with a PRACH transmission in another random access mechanism. Therefore, how to effectively indicate an RO set by using a PRACH mask index is a problem to be solved urgently.

SUMMARY

The present application provides a method for a node used for wireless communication and an apparatus. Various aspects involved in the present application are described below.

According to a first aspect, a method for a first node used for wireless communication is provided. The method includes: transmitting a first PRACH transmission on a first RO set, where the first RO set includes Nr ROs, the first PRACH transmission includes Nr preamble repetitions, the Nr ROs in the first RO set are consecutive in time, a first SSB index is one of a plurality of SSB indexes, the Nr ROs in the first RO set are associated with the first SSB index, the first RO set is one of a plurality of RO sets, the plurality of RO sets correspond to a same frequency resource index, each RO set in the plurality of RO sets includes Nr ROs, a first time offset is a time offset between each two successive RO sets in the plurality of RO sets, and the first time offset includes a positive integer quantity of ROs; and whether the first time offset is configured is used for determining a start RO in the first RO set.

According to a second aspect, a method for a second node used for wireless communication is provided. The method includes: receiving a first PRACH transmission on a first RO set, where the first RO set includes Nr ROs, the first PRACH transmission includes Nr preamble repetitions, the Nr ROs in the first RO set are consecutive in time, a first SSB index is one of a plurality of SSB indexes, the Nr ROs in the first RO set are associated with the first SSB index, the first RO set is one of a plurality of RO sets, the plurality of RO sets correspond to a same frequency resource index, each RO set in the plurality of RO sets includes Nr ROs, a first time offset is a time offset between each two successive RO sets in the plurality of RO sets, and the first time offset includes a positive integer quantity of ROs; and whether the first time offset is configured is used for determining a start RO in the first RO set.

According to a third aspect, a first node used for wireless communication is provided. The first node includes: a first transceiver, transmitting a first PRACH transmission on a first RO set, where the first RO set includes Nr ROs, the first PRACH transmission includes Nr preamble repetitions, the Nr ROs in the first RO set are consecutive in time, a first SSB index is one of a plurality of SSB indexes, the Nr ROs in the first RO set are associated with the first SSB index, the first RO set is one of a plurality of RO sets, the plurality of RO sets correspond to a same frequency resource index, each RO set in the plurality of RO sets includes Nr ROs, a first time offset is a time offset between each two successive RO sets in the plurality of RO sets, and the first time offset includes a positive integer quantity of ROs; and whether the first time offset is configured is used for determining a start RO in the first RO set.

According to a fourth aspect, a second node used for wireless communication is provided. The second node includes: a second transceiver, receiving a first PRACH transmission on a first RO set, where the first RO set includes Nr ROs, the first PRACH transmission includes Nr preamble repetitions, the Nr ROs in the first RO set are consecutive in time, a first SSB index is one of a plurality of SSB indexes, the Nr ROs in the first RO set are associated with the first SSB index, the first RO set is one of a plurality of RO sets, the plurality of RO sets correspond to a same frequency resource index, each RO set in the plurality of RO sets includes Nr ROs, a first time offset is a time offset between each two successive RO sets in the plurality of RO sets, and the first time offset includes a positive integer quantity of ROs; and whether the first time offset is configured is used for determining a start RO in the first RO set.

According to a fifth aspect, a first node used for wireless communication is provided. The first node includes a transceiver, a memory, and a processor, where the memory is configured to store a program, and the processor is configured to: invoke the program in the memory, and control the transceiver to receive or transmit a signal, to cause the first node to perform the method according to the first aspect.

According to a sixth aspect, a second node used for wireless communication is provided. The second node includes a transceiver, a memory, and a processor, where the memory is configured to store a program, and the processor is configured to: invoke the program in the memory, and control the transceiver to receive or transmit a signal, to cause the second node to perform the method according to the second aspect.

According to a seventh aspect, an embodiment of the present application provides a communications system, and the system includes the first node and/or the second node described above. In another possible design, the system may further include another device interacting with the first node or the second node in the solution provided in the embodiments of the present application.

According to an eighth aspect, an embodiment of the present application provides a computer-readable storage medium. The computer-readable storage medium stores a computer program, and the computer program causes a computer to perform some or all of the steps in the method according to the foregoing aspects.

According to a ninth aspect, an embodiment of the present application provides a computer program product. The computer program product includes a non-transitory computer-readable storage medium storing a computer program, and the computer program is operable to cause a computer to perform some or all of the steps of the method according to the foregoing aspects. In some implementations, the computer program product may be a software installation package.

According to a tenth aspect, an embodiment of the present application provides a chip. The chip includes a memory and a processor, and the processor may invoke a computer program from the memory and run the computer program, to implement some or all of the steps of the method according to the foregoing aspects.

In embodiments of the present application, the first node transmits the first PRACH transmission on the first RO set in the plurality of RO sets. The start RO in the first RO set is determined based on whether the first time offset associated with the plurality of RO sets is configured.

In embodiments of the present application, on a basis of indicating the start RO by using the PRACH mask index, the first node may further determine the start RO in the first RO set based on a configuration status of the first time offset.

In embodiments of the present application, the first PRACH transmission transmitted by the first node on the first RO set includes Nr preamble repetitions. Nr is a positive integer greater than 1.

In embodiments of the present application, the first RO set in which the start RO determined by the first node is located is used to transmit the first PRACH transmission with the plurality of preamble repetitions.

BRIEF DESCRIPTION OF THE DRAWINGS

FIG. 10 is a schematic diagram of another possible implementation of the method shown in FIG. 5.

FIG. 11 is a schematic flowchart of a possible implementation of the method shown in FIG. 5.

FIG. 12 is a schematic structural diagram of a first node used for wireless communication according to an embodiment of the present application.

DETAILED DESCRIPTION OF THE EMBODIMENTS

Communications System Architecture

Figure 1:
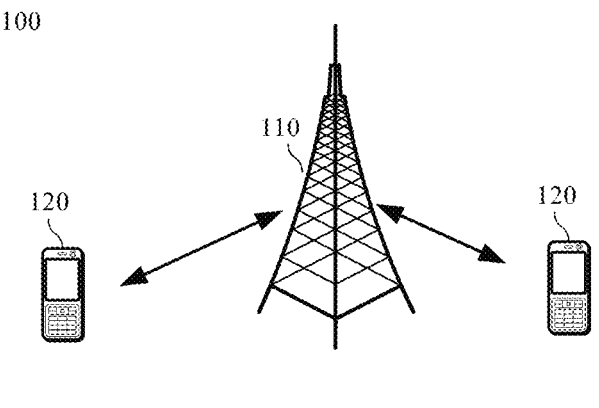
FIG. 1 is an example diagram of a system architecture of a wireless communications system to which an embodiment of the present application is applicable.

FIG. 1 is an example diagram of a system architecture of a wireless communications system 100 to which an embodiment of the present application is applicable. The wireless communications system 100 may include a network device 110 and a user equipment (UE) 120. The network device 110 may be a device in communication with the user equipment 120. The network device 110 may provide communication coverage for a specific geographic area, and may communicate with the user equipment 120 located within the coverage.

FIG. 1 exemplarily shows one network device and two user equipments. Optionally, the wireless communications system 100 may include a plurality of network devices, and another quantity of user equipments may be included within coverage of each network device, which is not limited in embodiments of the present application.

Optionally, the wireless communications system 100 may further include other network entities such as a network controller and a mobility management entity, which is not limited in embodiments of the present application.

It should be understood that the technical solutions of embodiments of the present application may be applied to various communications systems, such as a fifth generation (5G) system or an NR system, a long term evolution (LTE) system, an LTE frequency division duplex (FDD) system, and an LTE time division duplex (TDD) system. The technical solutions provided in the present application may further be applied to a future communications system, such as a sixth generation mobile communications system and a satellite communications system.

The user equipment in embodiments of the present application may also be referred to as a terminal device, an access terminal, a subscriber unit, a subscriber station, a mobile site, a mobile station (MS), a mobile terminal (MT), a remote station, a remote terminal, a mobile device, a user terminal, a terminal, a wireless communications device, a user agent, or a user apparatus. The user equipment in embodiments of the present application may be a device providing a user with voice and/or data connectivity and capable of connecting people, objects, and machines, such as a handheld device or a vehicle-mounted device having a wireless connection function. The user equipment in embodiments of the present application may be a mobile phone, a tablet computer (Pad), a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. Optionally, the UE may function as a base station. For example, the UE may function as a scheduling entity, which provides a sidelink signal between UEs in V2X, D2D, or the like. For example, a cellular phone and a vehicle communicate with each other by using a sidelink signal. A cellular phone and a smart home device communicate with each other, without relaying a communication signal by a base station.

The network device in embodiments of the present application may be a device for communicating with user equipment. The network device may also be referred to as an access network device or a wireless access network device. For example, the network device may be a base station. The network device in embodiments of the present application may be a radio access network (RAN) node (or device) through which the user equipment is connected to a wireless network. The base station may broadly cover following various names, or may be replaced with following names, such as a NodeB, an evolved NodeB (eNB), a next generation NodeB (gNB), a relay station, an access point, a transmitting and receiving node (TRP), a transmitting point (TP), a master eNodeB MeNB, a secondary eNodeB SeNB, a multi-standard radio (MSR) node, a home base station, a network controller, an access node, a radio node, an access point (AP), a transmission node, a transceiver node, a baseband unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, a similar object, or a combination thereof. Alternatively, the base station may be a communications module, a modem, or a chip disposed in the device or the apparatus described above. Alternatively, the base station may be a mobile switching center, a device that functions as a base station in device-to-device D2D communication, vehicle-to-everything (V2X) communication, and machine-to-machine (M2M) communication, a network-side device in a 6G network, a device that functions as a base station in a future communications system, or the like. The base station may support networks of a same access technology or different access technologies. A specific technology and specific device form used by the network device are not limited in embodiments of the present application.

The base station may be stationary, or may be mobile. For example, a helicopter or an unmanned aerial vehicle may be configured to serve as a mobile base station, and one or more cells may move according to a location of the mobile base station. In other examples, a helicopter or an unmanned aerial vehicle may be configured to function as a device in communication with another base station.

In some deployments, the network device in embodiments of the present application may be a CU or a DU, or the network device includes a CU and a DU. The gNB may further include an AAU.

The network device and the user equipment may be deployed on land, including being indoors or outdoors, handheld, or in-vehicle, may be deployed on a water surface, or may be deployed on a plane, a balloon, or a satellite in the air. In embodiments of the present application, a scenario where the network device and the user equipment are located is not limited.

It should be understood that all or some of functions of the communications device in the present application may also be implemented by software functions running on hardware, or by virtualization functions instantiated on a platform (for example, a cloud platform).

It should be understood that, for the explanation of the terms in embodiments of the present application, reference may be made to description protocols TS36 series, TS37 series, and TS38 series of the 3rd Generation Partnership Project (3GPP), and reference may also be made to description protocols of the Institute of Electrical and Electronics Engineers (IEEE).

For ease of understanding, some related technical knowledge related to embodiments of the present application is first introduced. The following related technologies, as optional solutions, may be randomly combined with the technical solutions of the embodiments of the present application, all of which fall within the protection scope of the embodiments of the present application. The embodiments of the present application include at least part of the following content.

Coverage Enhancements of PRACH Transmissions

Coverage performance of a communications system (for example, an NR system) is an important factor that needs to be considered when an operator performs commercial deployment of a communication network, because the coverage performance of the communications system directly affects quality of service of the communications system and costs of the operator, for example, capital expenditure (CAPEX) of the operator, the operating expense (OPEX) of the operator, and the like.

Coverage performance of a communications system varies with an operating frequency band of the communications system. For example, compared with an LTE system, an NR system may operate in a higher frequency band (for example, a millimeter wave frequency band), which results in a larger path loss of the NR system during operation in a higher frequency band, consequently resulting in poorer coverage performance of the NR system in a higher frequency band. Therefore, as a communications system may support increasingly high frequency bands, how to enhance coverage of the communications system has become a problem to be solved.

In most scenarios of practical deployment, since a capability of a user equipment is lower than that of a network device, coverage performance of an uplink (UL) is a bottleneck for enhancing coverage of a communications system. With the development of communication technologies, uplink services in some emerging vertical use cases gradually increase. For example, for a video uploading service, in a scenario with many uplink services, how to enhance uplink coverage is a problem that needs to be further solved.

In the related art, there has been a technical solution of coverage enhancement for some uplinks. For example, a coverage enhancement solution has been introduced for a physical uplink shared channel (PUSCH), a physical uplink control channel (PUCCH), and a message 3 (Msg3) in a random access procedure in Release 17 (Rel-17) of NR.

However, no coverage enhancement solution is designed for a PRACH in the Rel-17. performance of PRACH transmission is very important to many procedures such as an initial access procedure and a beam failure recovery procedure, and therefore, it is also very important to perform coverage enhancement on a PRACH. On such a basis, the 3GPP formally establishes, through the proposal of RP-221858, a work item (WI) of "further NR coverage enhancements" in Rel-18 of NR, in which enhancing coverage performance of PRACH transmission is one of the important topics of the work item.

To improve coverage performance of PRACH transmission, a PRACH transmission with a plurality of preamble repetitions is planned to be introduced in Release 18 (Rel-18) of NR, and may also be referred to as multiple PRACH transmissions. In this technical feature, the UE may transmit PRACH formats of a plurality of preamble repetitions respectively on a plurality of resources by using a same transmitting spatial filter (Tx spatial filter). In other words, the UE may transmit PRACH formats of a plurality of preamble repetitions by using a same transmit beam.

Further, for a PRACH transmission with a plurality of preamble repetitions, one PRACH occasion set (ROSet, RO set) is associated with a same synchronization signal/physical broadcast channel block index (SS/PBCH block index, SSB index). The RO set generally includes a plurality of valid PRACH occasions (RACH occasions, ROs). Optionally, the plurality of valid ROs in the RO set are consecutive in terms of time and use a same frequency resource in frequency domain. Optionally, a quantity of valid ROs in the RO set is configured by a higher layer. Optionally, the quantity of valid ROs in the RO set may be two, four, or eight.

It should be noted that, in embodiments of the present application, the SSB may represent a synchronization signal/physical broadcast channel block (SS/PBCH block), or may represent a synchronization signal block, which is not limited herein.

Further, the RO set is configured or determined within a time period X. In other words, the configured or determined RO set is repeated in the unit of the time period X. Optionally, the time period X may include K SSB-to-RO association pattern periods.

In a possible implementation, if one or more preamble repetitions in a PRACH transmission with a plurality of preamble repetitions are dropped due to a resource conflict, the dropped preamble repetitions are not transmitted at a later time.

It should be noted that the foregoing RO refers to a time-frequency resource that can be used for transmission of PRACH preambles. In addition, in an NR system, there is a specific mapping relationship between SSBs and ROs, that is, SSB-to-RO mapping. The mapping relationship is generally determined based on two parameters. For example, one parameter is msg1-FDM. The other parameter is ssb-perRACH-Occasion, or ssb-perRACH-OccasionAndCB-PreamblesPerSSB, or msgA-SSB-PerRACH-OccasionAndCB-PreamblesPerSSB.

The parameter msg1-FDM may indicate a quantity of frequency multiplexed (FDMed) RO(s) within a same period of time. The ssb-perRACH-Occasion may indicate a quantity of SSBs that are mapped to one RO, or a quantity of SSBs corresponding to each RO. The ssb-perRACH-OccasionAndCB-PreamblesPerSSB or the msgA-SSB-PerRACH-OccasionAndCB-PreamblesPerSSB may indicate a quantity of SSBs corresponding to each RO and a quantity of preamble indexes, mapped to one SSB, on each RO.

PRACH Mask Index

In some communications systems (for example, NR), a physical random access process of a UE may be triggered by a physical downlink control channel (PDCCH) order, or may be triggered by a higher layer. To reduce or avoid a probability of a conflict between random access preambles, a gNB/eNB may specify, by configuring a PRACH mask index, a resource for the UE to perform a PRACH transmission.

For example, the PRACH mask index may specify on which RO(s) within a system frame the UE performs the PRACH transmission. In 3GPP TS38.321, these RO(s) may be associated with a specified or selected SSB index, as shown in Table 1. As described above, a PRACH occasion in Table 1 is an RO, and a PRACH occasion index is an RO index.

8

TABLE 1

| PRACH mask index/<br>msgA-SSB-SharedRO-MaskIndex | Allowed PRACH occasion(s) of SSB |
|---|---|
| 0 | All |
| 1 | PRACH occasion index 1 |
| 2 | PRACH occasion index 2 |
| 3 | PRACH occasion index 3 |
| 4 | PRACH occasion index 4 |
| 5 | PRACH occasion index 5 |
| 6 | PRACH occasion index 6 |
| 7 | PRACH occasion index 7 |
| 8 | PRACH occasion index 8 |
| 9 | Every even PRACH occasion |
| 10 | Every odd PRACH occasion |
| 11 | Reserved |
| 12 | Reserved |
| 13 | Reserved |
| 14 | Reserved |
| 15 | Reserved |

In some embodiments, when a PRACH transmission is triggered by a PDCCH order, a downlink control information (DCI) format in the PDCCH is used for indicating a PRACH mask index. For example, a DCI format 1_0 is used for indicating a PRACH mask index and an SSB index associated with the PRACH mask index, as shown in Table 2. In Table 2, a cyclic redundancy check (CRC) in the DCI format 1_0 is scrambled by a cell radio network temporary identifier (C-RNTI). In addition, the DCI format 1_0 further indicates a DCI format identifier, frequency resource allocation, a random access preamble index, an uplink (UL) or supplementary uplink indicator, and a reserved bit.

TABLE 2

| DCI format 1_0 with a CRC being scrambled by a C-RNTI | |
|---|---|
| Field | Value |
| DCI format identifier (1 bit) | 1 |
| Frequency resource allocation | All ones |
| Random access preamble index (6 bits) | Not all zeros |
| UL/SUL indicator (1 bit) | 0/1 |
| SS/PBCH index (6 bits) | One of 0 to 63 |
| PRACH mask index (4 bits) | One of 0 to 10 |
| Reserved bits (12 bits or 10 bits) | Reserved |

In some embodiments, when a PRACH transmission is triggered by a higher layer, a PRACH mask index may be indicated by a radio resource control information element (RRC IE). For example, an RRC IE ra-ssb-OccasionMaskIndex is used for indicating the PRACH mask index.

In the NR system, ROs are consecutively mapped to each SSB index. Further, within each SSB-to-RO mapping cycle, an order of ROs indicated by the PRACH mask index is reset. For a PRACH transmission, the UE may select, for a specified SSB index and within a first available mapping cycle, an RO indicated by a value, of a PRACH mask index, in Table 2. For example, in the CFRA mechanism, a start RO in an RO set occupied by a plurality of preamble repetitions is determined based on the PRACH mask index, so as to determine the RO set. Optionally, the PRACH mask index may indicate an RO(s) for a same SSB.

Optionally, the PRACH mask index is used for indicating a start RO in an RO set corresponding to an SSB index.

As described above, a PRACH transmission with a plurality of preamble repetitions or multiple PRACH transmissions on one RO set is introduced in NR Rel-18. In this technology, the UE needs to select an RO set. The RO set includes a plurality of time multiplexed available ROs (TDMed).

The UE may select, based on the PRACH mask index, an RO set for an SSB index in following two manners.

In option 1, all RO sets within a time period X are first determined. The determined one or more RO sets are selected for transmitting preamble repetitions. Then, a PRACH mask index is used for indicating a start RO in an RO set. The RO set used for transmitting preamble repetitions may be determined based on a RO set in which the start RO is located. It may be learned that a manner of grouping first and mask second is used in option 1.

Figure 2:
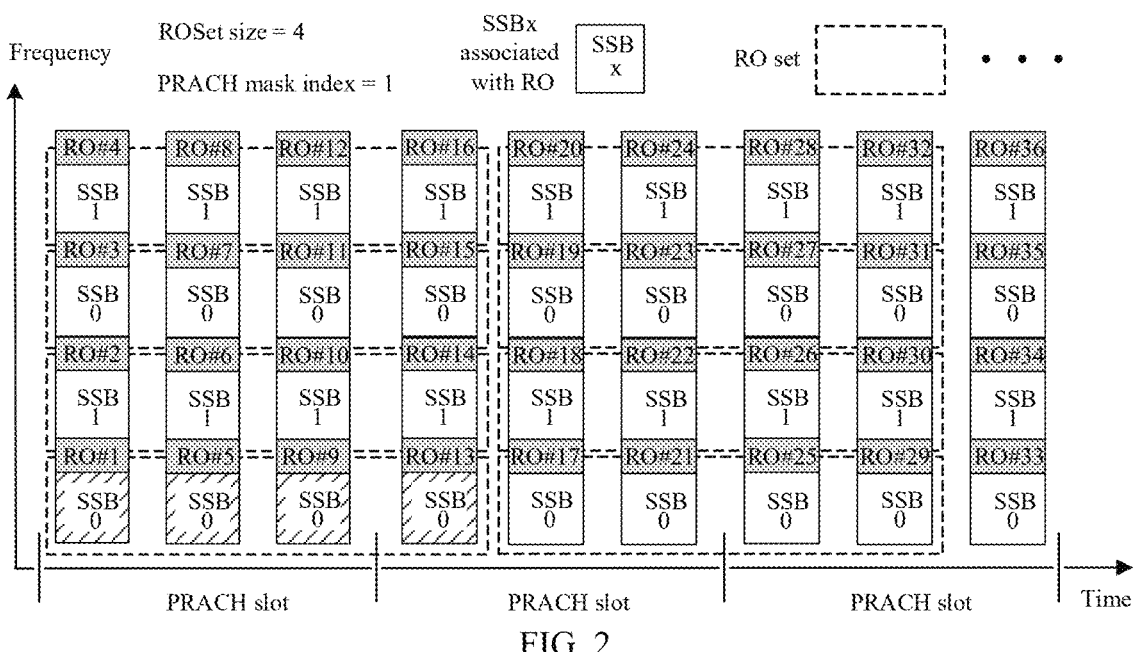
FIG. 2 is a schematic diagram of an implementation of determining a start RO in an RO set based on a PRACH mask index.

The following exemplarily describes the manner in option 1 in combination with a mapping relationship between SSBs and ROs shown in FIG. 2. In the example of FIG. 2, it is assumed that there are two SSB beams, and SSB indexes corresponding to the two SSB beams are an SSB 0 and an SSB 1 respectively.

Referring to FIG. 2, the time period X includes three PRACH slots. A quantity of time multiplexed ROs in each PRACH slot is 3. In frequency domain, a quantity of frequency multiplexed ROs is 4. Therefore, in each PRACH slot, there are 12 ROs, each of which corresponds to the SSB 0 or the SSB 1. FIG. 2 shows the SSB index associated with each RO.

It may be learned from FIG. 2 that a size of the RO set (ROSet size) is 4. Since four ROs in an RO set are time multiplexed, a plurality of RO sets within the time period X are shown by dashed boxes in FIG. 2. Each dashed box represents one RO set. It may be learned that, within the time period X, all RO sets have been determined.

Referring to FIG. 2, a value of the PRACH mask index is 1. It may be learned from indication of the PRACH mask index that a start RO in the RO set is an RO #1. Therefore, the RO set indicated by the PRACH mask index contains four ROs filled with shading, namely an RO #1, an RO #5, an RO #9, and an RO #13.

It may be learned from the foregoing Table 1 that an indication field of the PRACH mask index is limited. Therefore, the PRACH mask index may not be able to individually indicate some RO sets. For example, the indication field of the PRACH mask index cannot indicate an RO set with any one of an RO #17 to an RO #20 as a start RO in FIG. 2. Further, a larger ROSet size causes a larger index of a start RO in an RO set, and therefore, RO sets that can be indicated by the PRACH mask index are more limited.

In option 2, the PRACH mask index indicates an RO(s) for a same SSB. The RO(s) indicated by the PRACH mask index may be selected as a start RO in an RO set, and a subsequent RO(s) following the start RO forms the RO set together with the start RO. It may be learned that a manner of mask first and grouping second is used in option 2.

Figures 3, 4:
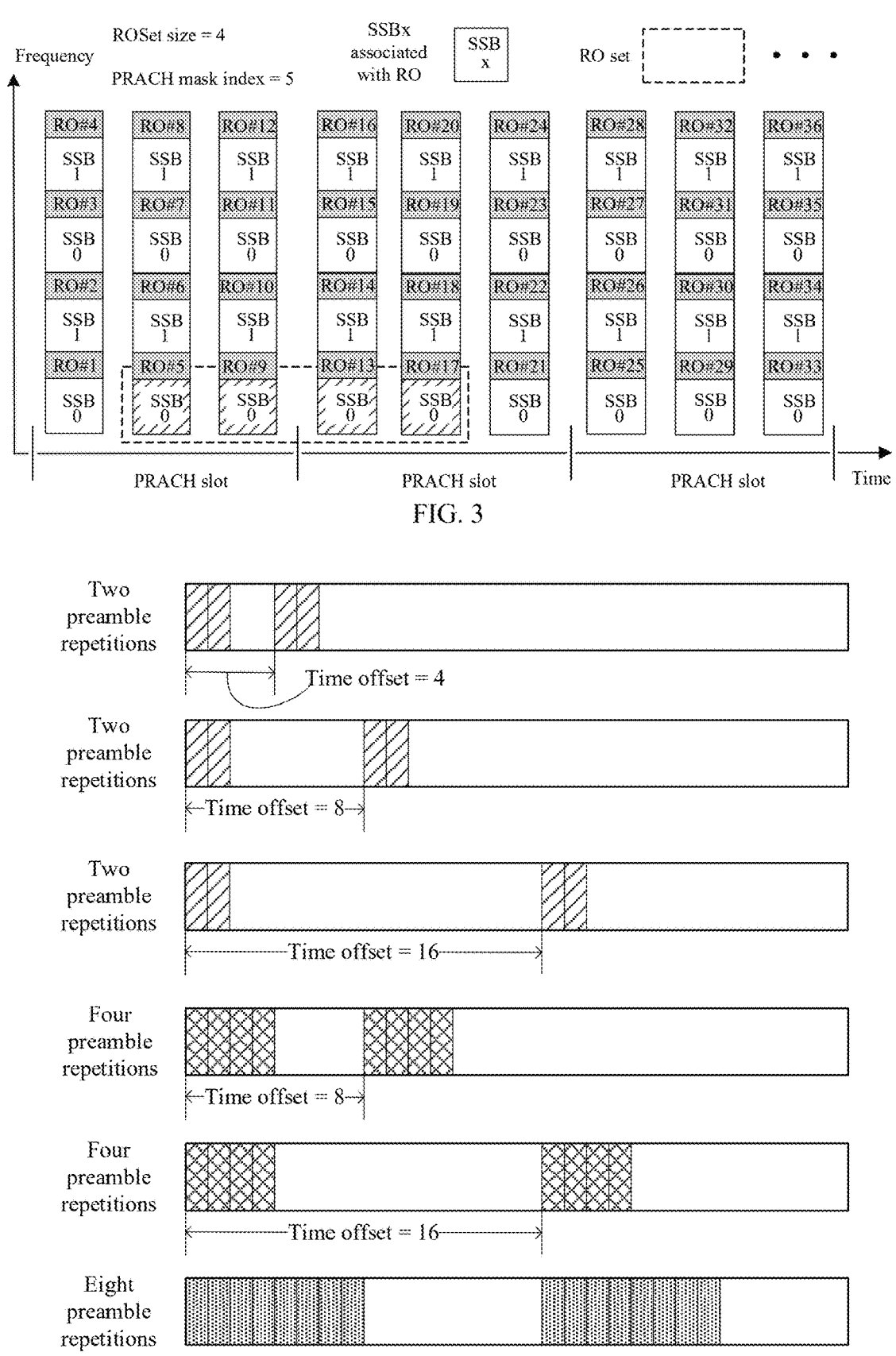
FIG. 3 is a schematic diagram of another implementation of determining a start RO in an RO set based on a PRACH mask index.
FIG. 4 is a schematic diagram of time offsets respectively corresponding to different quantities of preamble repetitions.

The following exemplarily describes the manner in option 2 in combination with a mapping relationship between SSBs and ROs shown in FIG. 3. Compared to FIG. 2, SSB indexes in FIG. 3 are still an SSB 0 and an SSB 1, and a quantity of ROs in each PRACH slot is also the same as in FIG. 2.

It may be learned from FIG. 3 that a value of the PRACH mask index is 5. It may be learned from indication of the PRACH mask index that a start RO in an RO set is an RO #5. Since the ROSet size is 4, the RO set determined based on the PRACH mask index is shown by the dashed box in FIG. 3. In other words, the RO set indicated by the PRACH mask index contains four ROs filled with shading, namely an RO #5, an RO #9, an RO #13, and an RO #17.

As shown in FIG. 3, in option 2, the formation of the RO set has a higher degree of freedom. Although the indication field of the PRACH mask index is limited, the PRACH mask index may indicate a larger quantity of RO sets than that in option 1. However, in the system, there is not only a PRACH transmission indicated by the PRACH mask index, but also an RO set selected by the UE rather than indicated by the PRACH mask index. It may be learned that if formation of the RO set indicated by the PRACH mask index is too flexible, it may result in a conflict with a PRACH transmission on an RO set that is selected by the UE rather than indicated by the PRACH mask index, consequently affecting system performance.

For example, a manner of selecting by the UE rather than indicating by the PRACH mask index may be an indication manner in the CBRA mechanism.

Time Offset Between RO Sets

The PRACH transmission with a plurality of preamble repetitions needs to occupy a plurality of ROs in RO sets during a single transmission. A preamble conflict is prone to be caused in a case of a limited quantity of ROs.

To reduce a probability of preamble conflict, density of the RO sets needs to be controlled. Therefore, a time offset between RO sets is introduced in NR Rel-18. Optionally, the time offset may be determined based on the first ROs in two successive RO sets. For example, for each frequency resource index in frequency multiplexed ROs, there is a time offset between the first RO in the former RO set and the first RO in the later RO set, as shown in FIG. 4.

The time offset between RO sets includes a plurality of consecutive valid ROs, and a value of the time offset (that is, a quantity of the plurality of consecutive valid ROs) may be provided by a piece of RRC layer signalling (for example, TimeOffsetBetweenStartingRO). At the RAN1 #115 meeting, it has been agreed upon values of the time offsets corresponding to PRACH transmissions with different quantities of preamble repetitions. Referring to FIG. 4, for a PRACH transmission with two preamble repetitions, the time offset may be one of 4, 8, and 16. For a PRACH transmission with four preamble repetitions, the time offset may be 8 or 16. For a PRACH transmission with eight preamble repetitions, the time offset can only be 16.

When the time offset between RO sets is configured, due to that a limited indication field of the PRACH mask index, available RO sets that can be indicated by the PRACH mask index are still limited even if the manner in option 1 (that is, a plurality of RO sets are first formed, and then indication by the PRACH mask index is performed) is used. This is because an index value of a start RO in an RO set with the time offset is relatively large.

In conclusion, after the PRACH transmission with a plurality of preamble repetitions and the time offset are introduced, the manner in option 1 may result in a limitation of indicated RO sets due to a limited indication field of the PRACH mask index, and the manner in option 2 may result in a conflict between the RO set indicated by the PRACH mask index and a PRACH transmission in another mechanism.

Therefore, in the PRACH transmission indicated based on the PRACH mask index, how to indicate an RO set used for the PRACH transmission with a plurality of preamble repetitions is a technical problem that needs to be studied. In particular, in the CFRA mechanism, how to effectively indicate an RO set used for a PRACH transmission with a plurality of preamble repetitions is a technical problem that needs to be solved urgently.

In addition, how to effectively indicate, by using the PRACH mask index, a time-frequency resource or an RO set for a PRACH transmission with a plurality of preamble repetitions, and how to solve a problem that the indication field of the PRACH mask index is limited are both technical problems that need to be solved.

In addition, in a case of a time offset between RO sets, how to indicate more valid RO sets by using a limited indication field of the PRACH mask index is also a technical problem that needs to be considered.

To solve the foregoing problems, embodiments of the present application provide a method for a node used for wireless communication and an apparatus. In this method, a first node (for example, a UE) transmits a first PRACH transmission with Nr preamble repetitions on a first RO set. The first node may determine a start RO in the first RO set based on whether a first time offset is configured, which is conducive to resolving the problem that the indication field of the PRACH mask index is limited. In addition, Nr is a positive integer greater than 1. The first PRACH transmission transmitted by the first node may reduce a random access delay and improve efficiency of utilizing random access resources while improving a performance gain of the PRACH transmission and extending coverage.

Embodiments of the present application may be applied to a scenario in which a PRACH transmission with a plurality of preamble repetitions is performed during an initial random access channel (RACH) occasion attempt for retransmission. During a plurality of RACH attempts for retransmission, repetitions with a plurality of preamble repetitions may be used in this scenario, to implement coverage enhancement of the PRACH.

In some embodiments, the PRACH transmission with a plurality of preamble repetitions mentioned in embodiments of the present application may refer to multiple PRACH transmissions by using a same beam, so that repetitions of a plurality of PRACHs are performed on a same beam to obtain a signal-to-noise ratio gain. In some embodiments, the PRACH transmission with a plurality of preamble repetitions mentioned in embodiments of the present application may refer to multi-PRACH transmission by using different beams, so that repetitions of a plurality of PRACHs are performed on different beams to obtain a diversity gain.

It should be noted that, the beam mentioned in embodiments of the present application may include or be replaced with at least one of following: a physical beam, a logical beam, a spatial filter, a spatial parameter, a spatial filter, a spatial transmission filter, a spatial reception filter, or an antenna port.

Embodiments of the present application may be applied to an initial access process or a beam failure recovery process. The initial access process is used as an example. Embodiments of the present application may be applied to a four-step random access procedure (namely, a type-1 random access procedure), or may be applied to a two-step random access procedure (namely, a type-2 random access procedure), which is not limited in embodiments of the present application.

Figures 5, 6, 7:
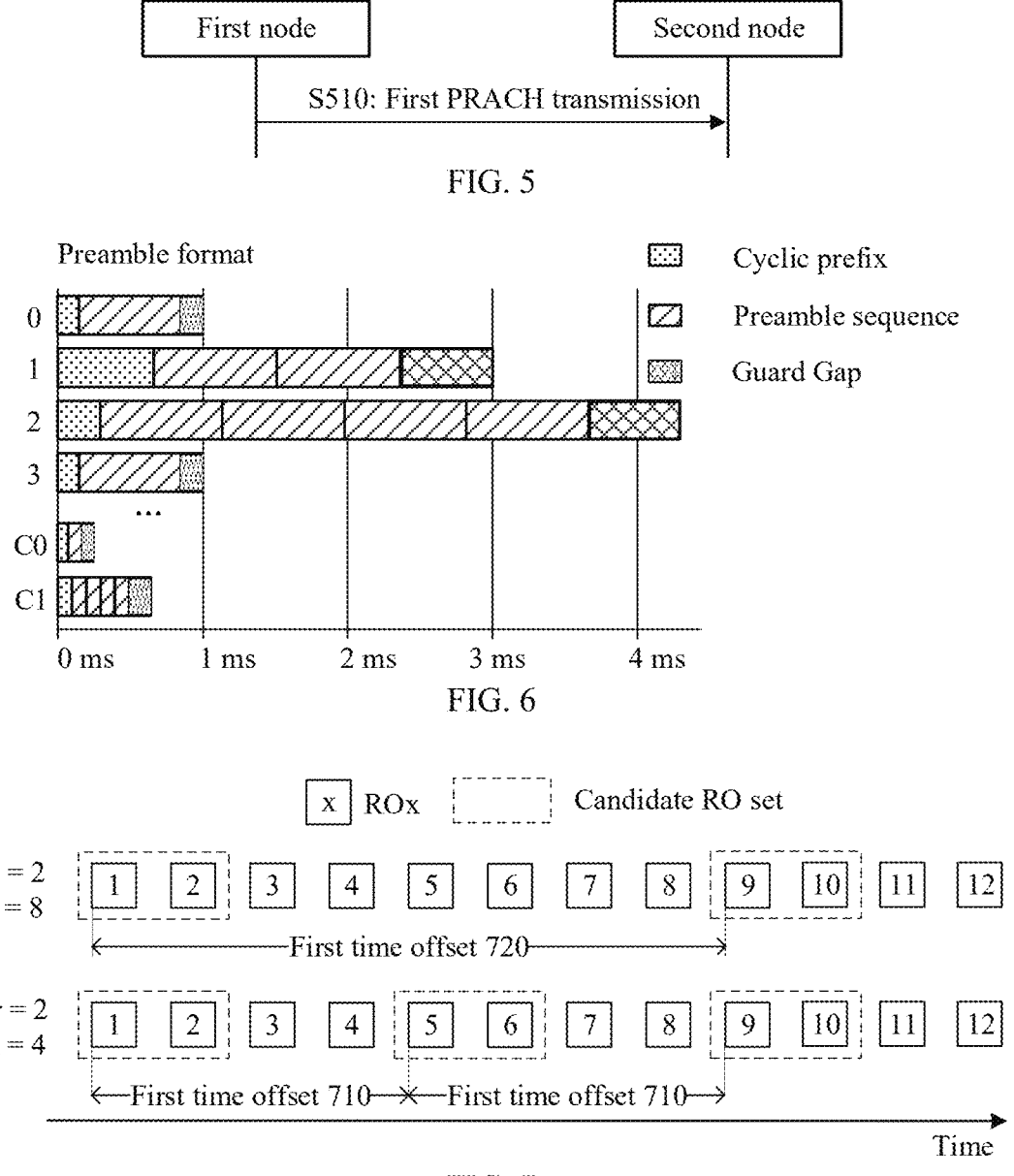
FIG. 5 is a schematic flowchart of a method for a first node used for wireless communication according to an embodiment of the present application.
FIG. 6 is a schematic diagram of several possible preamble formats corresponding to preamble repetitions in the method shown in FIG. 5.
FIG. 7 is a schematic diagram of a first time offset in the method shown in FIG. 5.

The method embodiments of the present application are described below in detail with reference to the accompanying drawings. FIG. 5 is a schematic flowchart of a method for a first node used for wireless communication according to an embodiment of the present application. As shown in FIG. 5, the method may be used for interaction between the first node and a second node.

In an embodiment, the first node may be a network-controlled repeater (NCR).

In an embodiment, the first node may be a user equipment, for example, the user equipment 120 shown in FIG. 1.

In an embodiment, the first node may be a relay, such as a relay terminal.

In an embodiment, the second node may be a network device, for example, the network device 110 shown in FIG. 1.

The method shown in FIG. 5 includes Step S510. The following describes this step.

In Step S510, the first node transmits a first PRACH transmission to the second node. It may be learned from the foregoing description that the first PRACH transmission is a first physical random access channel transmission.

The first node may transmit the first PRACH transmission in a random access procedure (also referred to as a random access process), or may transmit the first PRACH transmission in beam management, which is not limited herein.

For example, the random access procedure may be one or more RACH attempts performed by the first node based on the first PRACH transmission.

The first PRACH transmission includes Nr preamble repetitions. Nr is a positive integer greater than 1. It may be learned that the first PRACH transmission is a PRACH transmission with a plurality of preamble repetitions, and may also be referred to as multiple PRACH transmissions.

In an embodiment, the first PRACH transmission is configured with Nr preamble repetitions.

In an embodiment, Nr is configured by a higher layer.

In an embodiment, Nr is independently determined by the first node. In an example, the first node may determine a value of Nr based on a priority of a service. When a priority of a service is relatively high, Nr may be 4 or 8.

In an embodiment, Nr is a quantity of preamble repetitions included in the first PRACH transmission.

In an embodiment, Nr may be one of 2, 4, and 8.

In an embodiment, any two preamble repetitions in the Nr preamble repetitions may be identical or different.

In some embodiments, each preamble repetition in the Nr preamble repetitions in the first PRACH transmission may be replaced with one of a preamble, a PRACH preamble, a random access preamble, and a preamble format.

In some embodiments, the first node may perform the first PRACH transmission by transmitting Nr preamble repetitions. Transmitting, by the first node, the first PRACH transmission may be replaced with transmitting, by the first node, Nr preamble repetitions or performing transmission of Nr preamble repetitions.

In an embodiment, one or more preamble repetitions in the Nr preamble repetitions may be dropped.

In some embodiments, the Nr preamble repetitions correspond to at least one preamble format. For example, the Nr preamble repetitions included in the first PRACH transmission correspond to a plurality of different preamble formats, respectively. For example, at least two preamble repetitions in the Nr preamble repetitions included in the first PRACH transmission correspond to different preamble formats. In an example, a preamble repetition 1 in the plurality of preamble repetitions uses a preamble format including a plurality of sequences, and a preamble repetition 2 in the plurality of preamble repetitions uses a preamble format including one sequence.

In an embodiment, the Nr preamble repetitions correspond to one preamble format.

In an embodiment, each preamble repetition in the Nr preamble repetitions includes one preamble format.

In an embodiment, each preamble repetition in the Nr preamble repetitions is one preamble format.

In an embodiment, any two preamble repetitions in the Nr preamble repetitions use a same preamble format.

It should be noted that a preamble format corresponding to each preamble repetition in the Nr preamble repetitions may be any one of existing preamble formats, or may be any one of future preamble formats, which is not limited herein.

For ease of understanding, the following exemplarily describes, with reference to several preamble formats in FIG. 6, preamble formats to which the Nr preamble repetitions may correspond. FIG. 6 shows only some preamble formats for comparative description. It should be understood that the preamble formats in FIG. 6 are merely examples, and do not limit a plurality of preamble formats corresponding to the Nr preamble repetitions.

The preamble formats shown in FIG. 6 include a format 0 to a format 3, a format C0, and a format C1. It may be learned from FIG. 6 that a plurality of other preamble formats are further included between the format 3 and the format C0. Referring to FIG. 6, a preamble format mainly includes a cyclic prefix (CP) at the beginning, a preamble sequence (SEQ) in the middle, and a guard gap (GP) at the end. All preamble formats each include one CP and n SEQs, and some preamble formats may not include the GP.

It may be learned from FIG. 6 that a quantity n of SEQs may be 1. For example, for a format 0 and a format C0 in FIG. 6, the quantity n of SEQs is 1. A quantity n of SEQs may alternatively be another integer greater than 1. For example, in FIG. 6, a value of n for the format 1 is 2, and values of n for the format 2, the format 3, and the format C1 are 4.

Still referring to FIG. 6, different preamble formats are different in time length. For example, the format 0 and the format 3 each have a time length of 1 ms, the format 1 has a time length of 3 ms, the format 2 has a time length greater than 4 ms, and the format C0 and the format C1 each have a time length less than 1 ms. Since different preamble formats are different in total time length and the value of n, a time length of the CP, a time length of the SEQ, and a time length of the GP each vary in different formats.

The first node transmits the first PRACH transmission on the first RO set. For the second node, the second node receives the first PRACH transmission on the first RO set. It may be learned from the foregoing description that an RO represents an RACH occasion or a PRACH occasion, and the first RO set is a first PRACH occasion set.

In embodiments of the present application, the RO set may include or be replaced with at least one of following: an ROSet, a random access channel occasion group (ROG), a PRACH occasion group, or a PRACH transmission occasion set.

In an embodiment, the first RO set may be replaced with a first ROSet.

In an embodiment, the first RO set may be replaced with a first PRACH occasion group.

In an embodiment, the first RO set may be replaced with a first PRACH transmission occasion set.

The first RO set may include Nr ROs. Nr is as described above, and details are not repeated herein. In an embodiment, Nr is a quantity of ROs in the first RO set.

In embodiments of the present application, the RO may include or be replaced with at least one of following: an RACH occasion, a PRACH occasion, or a physical random access channel transmission occasion.

In an embodiment, the Nr ROs may be replaced with Nr PRACH occasions.

In an embodiment, the Nr ROs may be replaced with Nr PRACH transmission occasions.

In an embodiment, the Nr ROs included in the first RO set are consecutive in time.

In an embodiment, the Nr ROs included in the first RO set use a same frequency resource.

In an embodiment, the Nr ROs included in the first RO set are all valid. That an RO is valid means that a time-frequency resource corresponding to the RO may be used for the PRACH transmission.

A time resource corresponding to the first RO set is used to transmit the first PRACH transmission. In some embodiments, the first node may transmit the Nr preamble repetitions in first preamble repetitions by using the Nr ROs in the first RO set. In other words, the Nr preamble repetitions may be respectively carried on the Nr ROs.

The first RO set may be one of a plurality of RO sets. Each RO set in the plurality of RO sets includes Nr ROs. In other words, each RO set includes a same quantity of ROs, so as to determine the first RO set that is used to transmit the first PRACH transmission.

The plurality of RO sets correspond to a same frequency resource index. In some embodiments, the frequency resource index may be set based on different frequency units or different frequency band widths, which is not limited herein.

In an embodiment, that the plurality of RO sets correspond to a same frequency resource index means that frequency resources occupied by all the RO sets in the plurality of RO sets correspond to a same frequency resource index.

In an embodiment, that the plurality of RO sets correspond to a same frequency resource index means that the plurality of RO sets may be some or all RO sets corresponding to a same frequency resource index within a first period.

In an embodiment, that the plurality of RO sets correspond to a same frequency resource index includes that indexes of frequency resources occupied by any two RO sets in the plurality of RO sets are identical.

In an embodiment, that the plurality of RO sets correspond to a same frequency resource index includes that indexes of frequency resources occupied by Nr ROs in each RO set in the plurality of RO sets are identical.

In an embodiment, a frequency resource occupied by each RO in each RO set in the plurality of RO sets may be some or all frequency resources in frequency resources indicated by the same frequency resource index.

The first time offset is a time offset between each two successive RO sets in the plurality of RO sets. In other words, there is a same time offset, that is, the first time offset, between each two successive RO sets in the plurality of RO sets.

In an embodiment, in the plurality of RO sets, the first time offset may indicate a time offset between the first RO set and a previous RO set or a time offset between the first RO set and a next RO set.

In an embodiment, the first time offset is used for indicating a time offset between an RO at a first position in the first RO set and an RO at a first position in the second RO set, where the first RO set and the second RO set are each two successive RO sets in the plurality of RO sets. For example, the first time offset is a time offset between a start RO in the first RO set and a start RO in the second RO set. For another example, the first time offset is a first time offset between a third RO in the first RO set and a third RO in the second RO set.

The first time offset includes a positive integer quantity of ROs. An offset value of the first time offset may be represented by the positive integer quantity of ROs.

In an embodiment, duration of the first time offset is greater than or equal to duration of the positive integer quantity of ROs. As described above, a value of the first time offset is related to a quantity (Nr) of preamble repetitions.

Since a quantity of preamble repetitions is related to a quantity of ROs in each RO set, a value of the first time offset may be represented by a quantity of ROs.

In an embodiment, the positive integer quantity of ROs included in the first time offset are consecutive in terms of time.

In an embodiment, the positive integer quantity of ROs included in the first time offset are all valid.

In an embodiment, the positive integer quantity of ROs included in the first time offset are valid ROs that are consecutive in terms of time.

In an embodiment, the positive integer quantity of ROs included in the first time offset correspond to a same frequency resource index.

In an embodiment, a frequency resource index corresponding to the positive integer quantity of ROs included in the first time offset is the same as the frequency resource index corresponding to the plurality of RO sets.

In an embodiment, within a specific frequency band width, time offsets between a plurality of RO sets corresponding to different frequency resource indexes may be identical, or may be different, which is not limited herein.

In an embodiment, a time offset between a plurality of RO sets corresponding to a first frequency resource index is a first time offset, a time offset between a plurality of RO sets corresponding to a second frequency resource index is a second time offset, and the first time offset is identical to the second time offset.

In an embodiment, the first time offset is configured by a higher layer.

In an embodiment, the first time offset is indicated by an RRC IE.

In an embodiment, the first time offset includes TimeOffsetBetweenStartingRO.

In an embodiment, for a definition of TimeOffsetBetweenStartingRO, reference is made to 3GPP TS38.331.

In some embodiments, after a time location of a start RO set in the plurality of RO sets is determined, a time location of each RO set in the plurality of RO sets other than the start RO set may be determined based on the first time offset. For example, each RO set in the plurality of RO sets may be referred to as a candidate RO set. A plurality of candidate RO sets include the first RO set.

In an embodiment, a first candidate RO set and a second candidate RO set are each two successive RO sets in the plurality of RO sets, the first time offset includes MROs, and M is a positive integer. A start RO in the second candidate RO set is located M ROs after the start RO in the first candidate RO set.

In a sub-embodiment of the foregoing embodiment, the M ROs are valid ROs that are consecutive in terms of time.

In an embodiment, a value of M is greater than a value of Nr, and the value of M is a positive integer multiple of the value of Nr.

In an embodiment, a value of M is any one positive integer greater than a value of Nr.

In an embodiment, when a value of M is equal to or less than a value of Nr, it may indicate that the first time offset is not configured.

For ease of understanding, assuming that Nr is 2, the first time offset is exemplarily described with reference to FIG. 7. FIG. 7 shows 12 consecutive ROs in time domain, namely an RO #1 to an RO #12. It may be learned from FIG. 7 that, in a case that there is a same quantity (2) of ROs in each candidate RO set, the first time offset may be represented by a quantity M of ROs.

Referring to FIG. 7, the first time offset is determined based on a time offset between start ROs in two successive candidate RO sets. In a case of M=4, the first time offset 710 includes four ROs. In a case of M=8, the first time offset 720 includes eight ROs.

As shown in FIG. 7, after the first time offset is configured, an index of a start RO in a candidate RO set other than the first candidate RO set is increased. In a case of M=4, an index of a start RO in the second candidate RO set is 5, an index of a start RO in the third candidate RO set is 9, and so on. In a case of M=8, the index of the start RO in the second candidate RO set is 9, the index of the start RO in the third candidate RO set is 17 (not shown in FIG. 7), and so on.

Whether the first time offset is configured is used for determining the start RO in the first RO set, which may solve the problem that the indication field of the PRACH mask index is limited due to a time offset configured between RO sets, and may allow the first RO set to be more flexibly indicated. FIG. 7 is used as an example. After the first time offset is configured, an index of a start RO in an RO set is relatively large. When indication is based on only the PRACH mask index, a relatively small quantity of available RO sets may be indicated. To increase a range of RO sets that may be indicated, the first time offset needs to be considered in indicating the RO set. However, for a PRACH transmission, a higher layer may not necessarily configure a first time offset, or RRC may not necessarily indicate a first time offset. When the first time offset is not configured or not indicated, the index of the start RO in the first RO set may be relatively small, and the first time offset does not need to be considered in indicating the RO set.

In some embodiments, the first RO set may be determined by determining the start RO in the first RO set. Therefore, determining the start RO in the first RO set may be replaced with determining the first RO set.

In an embodiment, the start RO in the first RO set may be used to determine the first RO set that is used for transmitting the first PRACH transmission. For example, when the Nr ROs in the first RO set are consecutive in time and use a same frequency resource, one or more ROs, after the start RO, in the first RO set may be determined based on the start RO, so as to determine the first RO set.

Optionally, the start RO in the first RO set is the first RO in the Nr ROs included in the first RO set.

Optionally, the start RO in the first RO set is the earliest RO in time domain in the Nr ROs included in the first RO set.

In an embodiment, when the first time offset is configured, the first time offset is used to determine the start RO in the first RO set.

In an embodiment, when the first time offset is configured, the first time offset is used, together with another parameter, to determine, the start RO in the first RO set. The another parameter may include Nr and at least one of a first PRACH mask index, a quantity of a plurality of SSB indexes, a first SSB index, or a first mapping order that are described below, which is described in detail below with reference to embodiments.

In an embodiment, when the first time offset is configured, a quantity of ROs included in the first time offset is used to determine the start RO in the first RO set.

In an embodiment, when the first time offset is not configured, the first time offset is not used to determine the start RO in the first RO set.

The first node may trigger the first PRACH transmission in a plurality of manners. In other words, the first node may perform transmission of the first PRACH transmission based on a plurality of types of information. For example, the first node may trigger the first PRACH transmission based on first signalling transmitted by the second node. For another example, the first node may trigger the first PRACH transmission according to higher layer signalling.

In some embodiments, the first PRACH transmission is triggered by first signalling. In other words, after receiving the first signalling, the first node performs transmission of the first PRACH transmission. The first node may receive the first signalling in a plurality of manners.

In some embodiments, the first signalling may be transmitted to the first node by the second node. For example, the second node may transmit the first signalling to the first node by using DCI. In some embodiments, the first node may determine the first signalling by using higher layer signalling. For example, the first node may receive the first signalling by using radio resource control (RRC) signalling.

In an embodiment, the first signalling is DCI.

In an embodiment, the first signalling is a PDCCH order.

In an embodiment, the first signalling is an RRC IE.

In an embodiment, the first signalling is ra-ssb-Occasion-MaskIndex.

In an embodiment, for a definition of ra-ssb-Occasion-MaskIndex, reference is made to 3GPP TS38.331.

In an embodiment, the first signalling includes at least one of DCI or an RRC IE.

The first signalling may include a first PRACH mask index. It may be learned from the foregoing description that PRACH represents a physical random access channel, and the first PRACH mask index is a first physical random access channel mask index.

A value corresponding to the first PRACH mask index may be any one of the index values in the foregoing Table 1, or may be any one of index values in an extended Table 1, or may be any one of index values in a newly created PRACH mask index table, which is not limited herein.

In an embodiment, a value of the first PRACH mask index is one of 0 to 15.

In an embodiment, a value of the first PRACH mask index is one of 0 to 10.

In some embodiments, the first PRACH mask index is used for indicating an RO associated with a first SSB. The RO may be used as the start RO in the first RO set that is used to transmit the first PRACH transmission.

In an embodiment, the first PRACH transmission is triggered by first signalling, and the first signalling is a PDCCH order.

In an embodiment, the first signalling is a PDCCH order, and a value of a random access preamble index field included in the first signalling is not 0. The first node may perform transmission of the first PRACH transmission based on the value of the random access preamble index field in the PDCCH order.

In an embodiment, the first PRACH transmission is triggered by a higher layer.

In an embodiment, the first PRACH transmission is triggered by a higher layer, and the first signalling is an RRC IE.

In some embodiments, the first node may transmit the first PRACH transmission after receiving a first SSB. For example, the first node may receive a first SSB transmitted by the second node. The first SSB may be an SSB in a first SSB set transmitted by the second node. In other words, the first SSB is one of a plurality of SSBs included in the first SSB set.

In an embodiment, a quantity of SSBs in the first SSB set is indicated by higher layer signalling.

In an embodiment, a quantity of SSBs in the first SSB set is indicated by an RRC IE.

In an embodiment, a quantity of SSBs in the first SSB set is indicated by SIB1, or ssb-PositionsInBurst in Serving-CellConfigCommon.

In an embodiment, a quantity of SSBs in the first SSB set is equal to SIB1 or a value of ssb-PositionsInBurst in ServingCellConfigCommon.

In an embodiment, for a definition of SIB1, reference is made to 3GPP TS38.331.

In an embodiment, for a definition of ServingCellConfig-Common, reference is made to 3GPP TS38.331.

In an embodiment, the first SSB is related to the first RO set and/or the first PRACH transmission.

In an embodiment, the first SSB set includes the first SSB.

In an embodiment, the first SSB is selected from the plurality of SSBs.

In an embodiment, the first PRACH transmission is triggered by a higher layer, and the first SSB is selected from the plurality of SSBs.

In an embodiment, the first PRACH transmission is triggered by a higher layer, the first signalling is an RRC IE, and the first SSB is selected from the plurality of SSBs.

In some embodiments, the first node may determine the first SSB through measurement for the plurality of SSBs in the first SSB set. For example, a measurement value for the first SSB is a maximum value in a plurality of measurement values for the plurality of SSBs included in the first SSB set.

In some embodiments, the foregoing measurement value may be indicated by any one of parameters indicating signal quality. For example, the measurement value may be indicated by using a parameter such as reference signal received power (RSRP) and reference signal received quality (RSRQ).

In an embodiment, a measurement value for the first SSB includes an RSRP value.

In an embodiment, a plurality of measurement values for the plurality of SSBs included in the first SSB set are respectively a plurality of RSRP values.

In an embodiment, a plurality of measurement values for the plurality of SSBs included in the first SSB set include a plurality of maximum values, and the measurement value for the first SSB is one of the plurality of maximum values.

In a sub-embodiment of the foregoing embodiment, the measurement value for the first SSB is any one maximum value in the plurality of maximum values.

In a sub-embodiment of the foregoing embodiment, the measurement value for the first SSB is the first maximum value in the plurality of maximum values.

In some embodiments, an index of the first SSB may be used for the first node to determine a corresponding RO or RO set. An SSB index may indicate an SSB. The index of the first SSB is a first SSB index. The plurality of SSBs in the first SSB set correspond to a plurality of SSB indexes. For example, when the first SSB set includes four SSBs, the four SSBs correspond to four SSB indexes respectively, namely an SSB 0 to an SSB 3.

In an embodiment, the plurality of SSBs in the first SSB set are in one-to-one correspondence with the plurality of SSB indexes.

In an embodiment, a quantity of SSBs in the first SSB set is equal to a quantity of the plurality of SSB indexes.

In an embodiment, the plurality of SSB indexes are respectively indexes of the plurality of SSBs included in the first SSB set.

In an embodiment, each SSB index in the plurality of SSB indexes is an index of an SSB, that is in the plurality of SSBs and corresponds to the SSB index, in the plurality of SSBs. In an embodiment, the first SSB index is one of the plurality of SSB indexes.

In an embodiment, the first SSB index is an index of the first SSB in the plurality of SSBs included in the first SSB set.

In an embodiment, the Nr ROs in the first RO set are associated with the first SSB index.

The first SSB index may be carried in a plurality of types of information. For example, the index of the first SSB may be indicated by the first signalling.

In an embodiment, the first signalling includes the index of the first SSB.

In an embodiment, the first PRACH transmission is triggered by the first signalling, and the first signalling includes the index of the first SSB.

In an embodiment, the first PRACH transmission is triggered by the first signalling, the first signalling is a PDCCH order, and the first signalling includes the index of the first SSB.

In an embodiment, the first PRACH transmission is triggered by the first signalling, the first signalling is a PDCCH order, a value of a random access preamble index field included in the first signalling is not 0, and the first signalling includes the index of the first SSB.

A solution in which the first node transmits the first PRACH transmission on the first RO set and the first RO set is determined based on whether the first time offset is configured is described above with reference to FIG. 5 to FIG. 7, so that the first RO set may be more flexibly indicated. Further, when the first time offset is configured, the first RO set may be determined based on a value of the configured time offset. The following describes a specific implementation of determining the first RO set or a start RO in the first RO set based on whether the first time offset is configured and a value of the configured time offset.

In some embodiments, when the first time offset is configured, the start RO in the first RO set is related to the first time offset and another parameter. When the first time offset is not configured, the start RO in the first RO set is related to only another parameter. The another parameter includes at least one of a quantity of the plurality of SSB indexes, the first SSB index, or Nr.

In an embodiment, when the first time offset is configured, the start RO in the first RO set is related to all of a quantity of ROs included in the first time offset, a quantity of the plurality of SSB indexes, the first SSB index, and Nr. When the first time offset is not configured, the start RO in the first RO set is related to all of a quantity of the plurality of SSB indexes, the first SSB index, and Nr.

In some embodiments, whether the first time offset is configured is used for determining an index of the start RO in the first RO set. Determining the start RO in the first RO set includes determining the index of the start RO in the first RO set. The start RO in the first RO set may be determined by determining the index of the start RO.

In some embodiments, the first period includes a plurality of candidate ROs. Each RO in the plurality of RO sets belongs to the plurality of candidate ROs within the first period. It may be learned that the plurality of candidate ROs include each RO in the plurality of RO sets.

In an embodiment, the index of the start RO in the first RO set is an index of the start RO, in the first RO set, in the plurality of candidate ROs.

In an embodiment, the index of the start RO in the first RO set is an index of the start RO, in the first RO set, in the plurality of candidate ROs within the first period.

In an embodiment, the plurality of candidate ROs correspond to a plurality of RO indexes. A start index in a plurality of candidate RO indexes is also related to the index of the start RO in the first RO set.

In an embodiment, when the first time offset is configured, the index of the start RO in the first RO set is related to all of a quantity of ROs included in the first time offset, a quantity of the plurality of SSB indexes, the first SSB index, and Nr. When the first time offset is not configured, the index of the start RO in the first RO set is related to all of a quantity of the plurality of SSB indexes, the first SSB index, and Nr.

In an embodiment, when the first time offset is configured, the index of the start RO in the first RO set is determined based on a quantity of ROs included in the first time offset, a quantity of the plurality of SSB indexes, the first SSB index, and Nr. When the first time offset is not configured, the index of the start RO in the first RO set is determined based on a quantity of the plurality of SSB indexes, the first SSB index, and Nr.

In some embodiments, the first period may be used to determine a plurality of ROs associated with the SSBs in the first SSB set. The first period may be the time period X described above, or may be another time period used for indicating a plurality of ROs, which is not limited herein.

In an embodiment, the first period starts from a radio frame 0.

In an embodiment, the first period includes at least one association pattern period.

In an embodiment, the first period includes at least one SSB index-to-RO association pattern period.

In an embodiment, the association pattern period is an SSB index-to-RO association pattern period.

In an embodiment, the association pattern period is an SSB-to-RO association pattern period.

In an embodiment, the association pattern period includes at least one association period.

In an embodiment, the association pattern period includes at least one SSB index-to-RO association period.

In an embodiment, the association period is an SSB index-to-RO association period.

In an embodiment, the association period is an SSB-to-RO association period.

In an embodiment, the first period includes at least one SSB index-to-RO association period.

In an embodiment, the first period includes at least one association period.

In an embodiment, the association period includes at least one mapping cycle.

In an embodiment, the association period includes at least one SSB index-to-RO mapping cycle.

In an embodiment, the first period includes at least one SSB index-to-RO mapping cycle.

In an embodiment, the first period includes at least one mapping cycle.

In some embodiments, the first period includes a plurality of candidate RO sets. Whether the first time offset is configured is used for determining an index of the first RO set in the plurality of candidate RO sets.

In some embodiments, the first RO set is selected from the plurality of candidate RO sets. The plurality of candidate RO sets may be a plurality of RO sets preconfigured within the first period, so as to avoid a conflict with a PRACH transmission in the CBRA mechanism.

In an embodiment, within the time period X, a plurality of candidate RO sets used for the PRACH transmission with a plurality of preamble repetitions may be preconfigured before indication by the PRACH mask index, that is, the first RO set may be determined in the manner in option 1 described above. For another example, to avoid a conflict between a PRACH transmission with a plurality of preamble repetitions in the CFRA mechanism and a PRACH transmission with a plurality of preamble repetitions in the CBRA mechanism, a plurality of RO sets, used for the PRACH transmission with the plurality of preamble repetitions, within the time period X need to be preconfigured before indication by the PRACH mask index. In other words, the manner in option 1 is used for indicating an RO set or a start RO in an RO set.

In an embodiment, each RO set in the plurality of RO sets is one of the plurality of candidate RO sets.

In an embodiment, the plurality of candidate RO sets are a plurality of RO sets related to the first SSB and/or the first PRACH transmission.

In an embodiment, the plurality of candidate RO sets correspond to indexes of the plurality of candidate RO sets. The index of the first RO set in the plurality of candidate RO sets may represent a location of the first RO set in the plurality of candidate RO sets.

In some embodiments, when the first time offset is configured, the index of the first RO set in the plurality of candidate RO sets is related to all of a quantity of ROs included in the first time offset, a quantity of the plurality of SSB indexes, the first SSB index, and Nr. When the first time offset is not configured, the index of the first RO set in the plurality of candidate RO sets is related to all of a quantity of the plurality of SSB indexes, the first SSB index, and Nr.

In an embodiment, when the first time offset is configured, the index of the first RO set in the plurality of candidate RO sets is determined based on a quantity of ROs included in the first time offset, a quantity of the plurality of SSB indexes, the first SSB index, and Nr. When the first time offset is not configured, the index of the first RO set in the plurality of candidate RO sets is determined based on a quantity of the plurality of SSB indexes, the first SSB index, and Nr.

It may be learned from the foregoing description that the first node may trigger the first PRACH transmission after receiving the first signalling. The first signalling includes the first PRACH mask index. The first PRACH mask index is also used to determine the first RO set or the start RO in the first RO set.

In some embodiments, when the first time offset is configured, the start RO in the first RO set is related to both the first time offset and the first PRACH mask index. When the first time offset is not configured, the start RO in the first RO set is related to the first PRACH mask index.

In an embodiment, when the first time offset is configured, the start RO in the first RO set is determined based on the first time offset and the first PRACH mask index. When the first time offset is not configured, the start RO in the first RO set is determined based on the first PRACH mask index.

In an embodiment, when the first time offset is configured, the start RO in the first RO set is related to a quantity of ROs included in the first time offset and another parameter. When the first time offset is not configured, the start RO in the first RO set is related to only another parameter. The another parameter includes at least one of a quantity of SSBs in the first SSB set, an index of the first SSB, Nr, or the first PRACH mask index.

In an embodiment, when the first time offset is configured, the index of the start RO in the first RO set is related to both the first time offset and the first PRACH mask index. When the first time offset is not configured, the index of the start RO in the first RO set is related to the first PRACH mask index.

In an embodiment, when the first time offset is configured, the index of the start RO in the first RO set is determined based on the first time offset and the first PRACH mask index. When the first time offset is not configured, the index of the start RO in the first RO set is determined based on the first PRACH mask index.

In an embodiment, when the first time offset is configured, the index of the start RO in the first RO set is related to a quantity of ROs included in the first time offset and another parameter. When the first time offset is not configured, the index of the start RO in the first RO set is related to only another parameter. The another parameter includes at least one of a quantity of SSBs in the first SSB set, an index of the first SSB, Nr, or the first PRACH mask index.

In an embodiment, when the first time offset is configured, the index of the first RO set in the plurality of candidate RO sets is related to both the first time offset and the first PRACH mask index. When the first time offset is not configured, the index of the first RO set in the plurality of candidate RO sets is related to the first PRACH mask index.

In an embodiment, when the first time offset is configured, the index of the first RO set in the plurality of candidate RO sets is determined based on the first time offset and the first PRACH mask index. When the first time offset is not configured, the index of the first RO set in the plurality of candidate RO sets is determined based on the first PRACH mask index.

In an embodiment, when the first time offset is configured, the index of the first RO set in the plurality of candidate RO sets is related to a quantity of ROs included in the first time offset and another parameter. When the first time offset is not configured, the index of the first RO set in the plurality of candidate RO sets is related to only another parameter. The another parameter includes at least one of a quantity of SSBs in the first SSB set, an index of the first SSB, Nr, or the first PRACH mask index.

The method embodiments in which the start RO in the first RO set is determined based on whether the first time offset is configured are described above. With the method, the problem that the indication field of the PRACH mask index is limited due to the first time offset may be solved. For ease of understanding, a method for determining the first RO set based on whether the first time offset is configured is exemplarily described below with reference to FIG. 8 and FIG. 9 by using an example in which the start RO in the first RO set is determined based on the first time offset and the first PRACH mask index.

Figure 8:
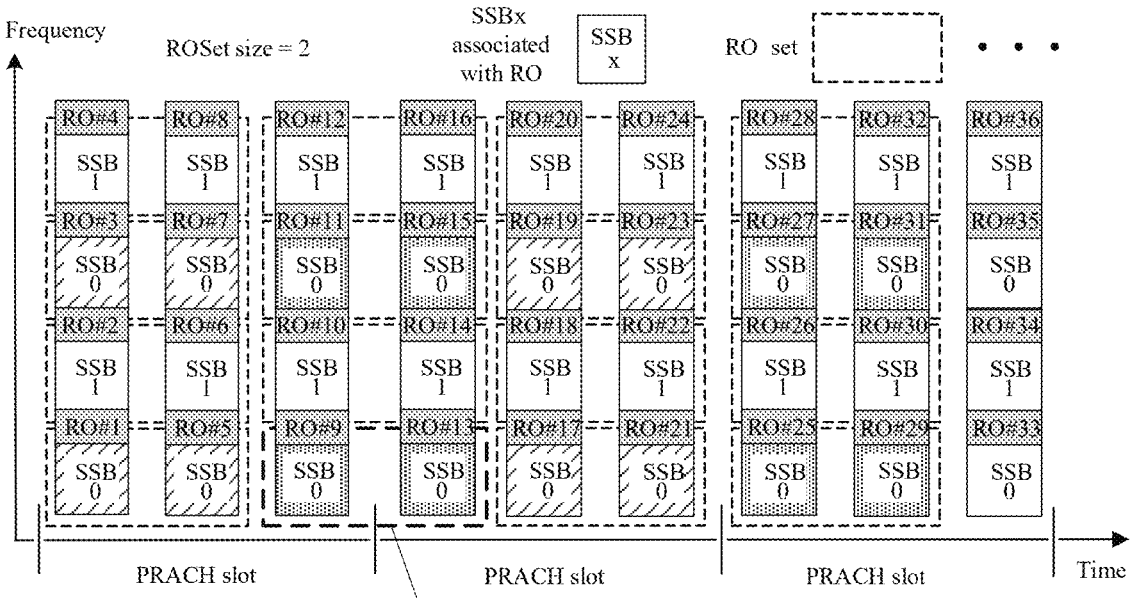
FIG. 8 is a schematic diagram of a possible implementation of the method shown in FIG. 5.
Figure 9:
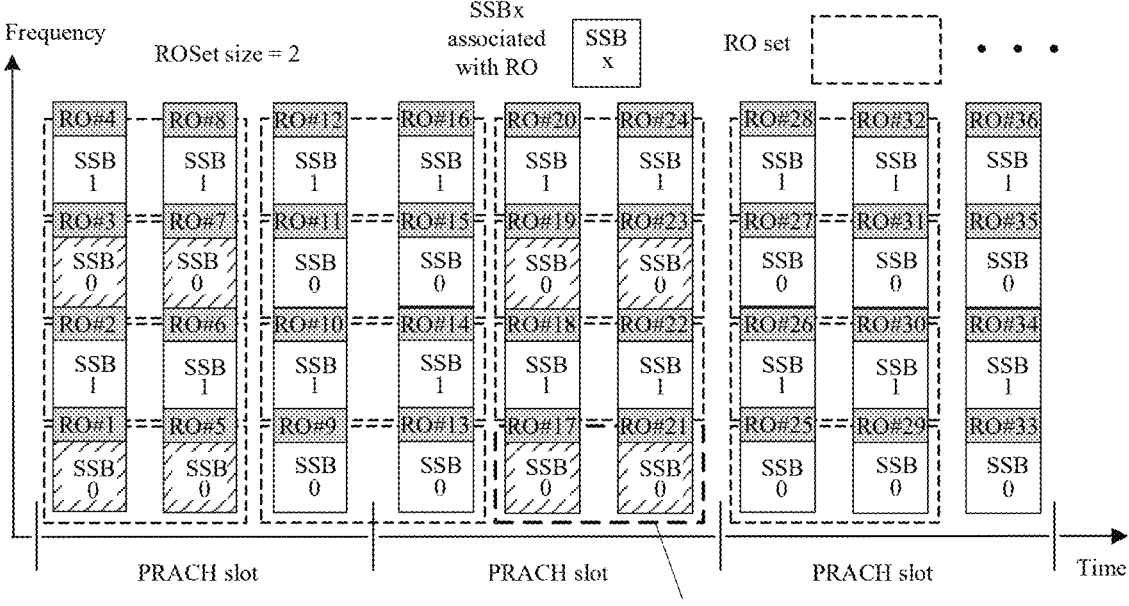
FIG. 9 is a schematic diagram of another possible implementation of the method shown in FIG. 5.

Mapping relationships in FIG. 8 and FIG. 9 are the same as those in FIG. 2, and details are not repeated herein. FIG. 8 shows an example in which the first time offset is not configured. FIG. 9 shows an example in which a quantity of ROs included in the first time offset is 4. FIG. 10 shows an example in which a quantity of ROs included in the first time offset is 8, where a quantity of SSBs (a quantity of a plurality of SSB indexes) is 2, and an ROSet size is 2, that is, Nr is 2.

Referring to FIG. 8, the first time offset is not configured, and a plurality of candidate RO sets corresponding to an SSB 0 are preconfigured and filled with shading. When the first PRACH mask index is 3, it may be determined, based on a quantity of the plurality of SSB indexes, the first SSB index, and the first PRACH mask index, that the start RO in the first RO set is an RO #9.

Referring to FIG. 9, an offset value of the first time offset is configured as 4, that is, a quantity of ROs included in the first time offset is 4. RO sets filled with shading in FIG. 8 are a plurality of candidate RO sets, corresponding to the SSB 0, determined based on the quantity of ROs included in the first time offset. When the first PRACH mask index is 3, it may be determined, based on a quantity of ROs included in the first time offset, a quantity of the plurality of SSB indexes, the first SSB index, and the first PRACH mask index, that the start RO in the first RO set is an RO #17.

Referring to FIG. 10, an offset value of the first time offset is configured as 8, that is, a quantity of ROs included in the first time offset is 8. RO sets filled with shading in FIG. 8 are a plurality of candidate RO sets, corresponding to the SSB 0, determined based on the quantity of ROs included in the first time offset. When the first PRACH mask index is 3, it may be determined, based on a quantity of ROs included in the first time offset, a quantity of the plurality of SSB indexes, the first SSB index, and the first PRACH mask index, that the start RO in the first RO set is an RO #33.

It may be learned from FIG. 8 to FIG. 10 that in a case of determining the start RO in the first RO set based on whether the first time offset is configured and a configured offset value, the index of the start RO is much greater than a maximum RO index that can be indicated by the first PRACH mask index in Table 1. Therefore, RO sets that may be indicated with this method are not limited by the indication field of the first PRACH mask index.

The method embodiments in which the first RO set or the start RO in the first RO set is determined based on whether the first time offset is configured are described above with reference to FIG. 4 to FIG. 10. This method is conducive to solving the problem that the indication field of the PRACH mask index is limited. With this method, the advantage, of avoiding a conflict with another PRACH transmission, in the manner in option 1 may be maintained, and the PRACH mask index may indicate RO sets more flexibly.

However, not all preambles within one RO are necessarily associated with a same SSB. In other words, one RO may be associated with a plurality of SSBs. When there are 64 preambles within one RO, after SSBs are mapped to ROs according to the SSB-to-RO mapping relationship, each two successive RO sets may not be calculated from each other by using the foregoing formula or in another manner. For example, a difference between a start RO in a later RO set and a start RO in a former RO set is not necessarily an integer multiple of a quantity of SSBs and/or Nr.

To solve this problem, an embodiment of the present application further proposes a method for determining a start RO in a first RO set. In this method, the first RO set may further be related to a first mapping order, so as to maximize a range of RO sets that can be indicated.

In some embodiments, the first mapping order is a mapping relationship following which a plurality of SSB indexes may be mapped to a plurality of candidate ROs. The first mapping order is used for mapping the plurality of SSB indexes to a plurality of candidate ROs within the first period. The first mapping order may be an existing mapping relationship between SSBs and ROs, or may be an extended mapping relationship between SSBs and ROs, which is not limited herein.

In an embodiment, the first mapping order may be associated with one or more of following: indexes of preambles within the first RO set, frequency resources for the plurality of candidate RO sets, and time resources for the plurality of candidate RO sets.

In an embodiment, the first mapping order may include a varying order of indexes of preambles within one candidate RO set in the plurality of candidate RO sets, for example, increasing order of the indexes of the preambles, decreasing order of the indexes of the preambles, or the like. In other words, the plurality of SSB indexes may be ordered according to a varying order of indexes of preambles within one candidate RO set in the plurality of candidate RO sets.

In an embodiment, the first mapping order may include a varying order of frequency resources for the plurality of candidate RO sets, for example, increasing order of the frequency resources, decreasing order of the frequency resources, or the like. In other words, the plurality of SSB indexes may be ordered according to a varying order of frequency resources for the plurality of frequency multiplexed candidate RO sets.

In an embodiment, the first mapping order may include a varying order of time resources for the plurality of candidate RO sets, for example, increasing order of the time resources, decreasing order of the time resources, or the like. In other words, the plurality of SSB indexes may be ordered according to a varying order of time resources for the plurality of time multiplexed candidate RO sets.

In an embodiment, the first mapping order may include one or more of following orders: increasing order of indexes of preambles within one RO set in the plurality of candidate RO sets, increasing order of frequency resources for the plurality of candidate RO sets, or increasing order of time resources for the plurality of candidate RO sets.

In an embodiment, the first mapping order may include: first in increasing order of indexes of preambles within one candidate RO set in the plurality of candidate RO sets; then in increasing order of frequency resources for the plurality of candidate RO sets; and then in increasing order of time resources for the plurality of candidate RO sets. It should be understood that the first mapping order may alternatively include a random arrangement and combination of the foregoing several orders, which is not limited herein.

In an embodiment, the start RO in the first RO set may be related to whether the first time offset is configured and a configured offset value, the first mapping order, a quantity of the plurality of SSB indexes, the first SSB index, Nr, and the first PRACH mask index.

In an embodiment, the first RO set may be related to whether the first time offset is configured and another parameter. The another parameter includes some or all of the first mapping order, the quantity of SSBs, the first SSB index, Nr, and the first PRACH mask index.

In an embodiment, regardless of whether the first time offset is configured, the start RO in the first RO set is related to mapping from a quantity of the plurality of SSB indexes to the plurality of ROs.

In an embodiment, regardless of whether the first time offset is configured, the start RO in the first RO set is related to mapping from a quantity of the plurality of SSB indexes to the plurality of candidate ROs, Nr, and the first PRACH mask index.

In some embodiments, the first node may first map the plurality of SSB indexes to the plurality of candidate ROs in the first mapping order. The plurality of candidate ROs include the Nr ROs in the first RO set. For example, the plurality of candidate ROs may be some or all of the ROs within the first period.

In an embodiment, at least two candidate ROs in the plurality of candidate ROs are frequency multiplexed (FDM). For example, an RO #1 and an RO #2 in FIG. 8 are frequency multiplexed.

In an embodiment, at least two candidate ROs in the plurality of candidate ROs are FDMed.

In an embodiment, at least two candidate ROs in the plurality of candidate ROs are frequency multiplexed PRACH occasions.

In an embodiment, the plurality of candidate ROs are all time multiplexed (TDM).

In an embodiment, the plurality of time multiplexed candidate ROs may also be expressed as the plurality of TDMed candidate ROs.

In an embodiment, the plurality of candidate ROs are time multiplexed PRACH occasions.

In an embodiment, at least two candidate ROs in the plurality of candidate ROs are TDMed.

In an embodiment, at least Nr ROs in the plurality of candidate ROs are TDMed.

In an embodiment, the plurality of candidate ROs are within at least one PRACH slot.

In an embodiment, the plurality of candidate ROs are within one PRACH slot.

In an embodiment, the plurality of candidate ROs are within a plurality of PRACH slots.

The foregoing describes a plurality of manners in which the first RO set is indicated based on whether the first time offset is configured and a plurality of other parameters. In the plurality of other parameters, the first PRACH mask index may be indicated by using first signalling. An SSB-related parameter is determined by receiving and detecting the first SSB set. The first node is further required to determine Nr and the first mapping order. The following describes a method for determining these parameters by the first node.

In some embodiments, the first node may determine, by receiving first information, a parameter for indicating the first RO set. For example, the first node may receive the first information transmitted by the second node.

In an embodiment, the first information may include a part of parameters for indicating the first RO set.

In an embodiment, the first information may be used to determine a part of parameters for indicating the first RO set.

In an embodiment, the mapping relationship between SSBs and ROs includes a quantity of SSB indexes associated with one RO and a quantity of preambles corresponding to each SSB index of each RO. In other words, the first information may be used to determine the first mapping order.

In an embodiment, the first information and the first mapping order are used for determining the plurality of candidate ROs, to which the plurality of SSB indexes are mapped, within the first period.

In an embodiment, the first information, the first mapping order, and a quantity of the plurality of SSB indexes are used for determining a mapping from the plurality of SSB indexes to the plurality of ROs.

In an embodiment, the first information, the first mapping order, and a quantity of the plurality of SSB indexes are used for determining an association between the plurality of SSB indexes and the plurality of ROs.

In some embodiments, the first information may be used for indicating a quantity of SSB indexes associated with one RO and a quantity of preambles corresponding to each SSB index of each RO. In other words, the first information is used for determining a quantity of SSBs corresponding to each RO and a quantity of contention-based preambles corresponding to each SSB.

In an embodiment, the first information indicates that N SSB indexes are associated with one RO, where N is less than 1, or N is not less than 1.

In an embodiment, the first information indicates that R preambles are associated with each SSB index of each RO, where R is a positive integer. For example, when each RO is associated with a plurality of SSB indexes, each SSB index in the plurality of SSB indexes is associated with R preambles on the RO.

In an embodiment, R is a positive integer not greater than 64. Generally, there are 64 preambles on one RO. Therefore, R is not greater than 64.

In an embodiment, the first information indicates that one SSB index is associated with R preambles on one RO.

In an embodiment, the first information indicates that one SSB index is mapped to R preambles on one RO.

In an embodiment, the first information indicates that N SSB indexes are associated with one RO, and the first information indicates that R preambles are associated with each SSB index of each RO.

In an embodiment, the R preambles are respectively R contention-based preambles.

Optionally, indexes of the R preambles are consecutive. Optionally, the R preambles have consecutive indexes.

In some embodiments, the first information includes ssb-perRACH-Occasion, or ssb-perRACH-OccasionAndCB-PreamblesPerSSB, or msgA-SSB-PerRACH-OccasionAndCB-PreamblesPerSSB in 3GPP TS38.331.

In an embodiment, the first information includes an RRC IE.

In an embodiment, the first information is ssb-perRACH-OccasionAndCB-PreamblesPerSSB.

In an embodiment, for a definition n of ssb-perRACH-OccasionAndCB-PreamblesPerSSB, reference is made to 3GPP TS38.331.

In some embodiments, the first information is further used for indicating a parameter related to frequency multiplexing, for example, a quantity of frequency multiplexed ROs. The parameter related to frequency multiplexing may also be used as a parameter in the another parameter, and details are not repeated herein.

In an embodiment, the first information indicates a quantity of frequency multiplexed ROs within a period of time.

In an embodiment, the first information indicates a quantity of frequency multiplexed ROs in the plurality of ROs.

In an embodiment, the first information includes msg1-FDM.

In an embodiment, for a definition of msg1-FDM, reference is made to 3GPP TS38.331.

In some embodiments, the first node may determine Nr by receiving second information. For example, the first node receives the second information transmitted by the second node. The second information may include Nr.

In an embodiment, the second information is configured by a higher layer. In an embodiment, the second information includes an RRC IE.

In some embodiments, the first node may determine the plurality of candidate RO sets based on the first mapping order, a quantity of the plurality of SSB indexes, the first SSB index, and Nr. Then, the first node may determine the first RO set or the start RO in the first RO set based on whether the first time offset is configured and a configured offset value, and the first PRACH mask index.

The following describes embodiments of the present application in more detail with reference to FIG. 11 as a specific example. It should be noted that the examples in FIG. 5 to FIG. 10 are merely intended to help a person skilled in the art understand embodiments of the present application, and are not intended to limit embodiments of the present application to a specific value or a specific scenario that is exemplified. Apparently, a person skilled in the art may perform various equivalent modifications or variations based on the examples given in FIG. 5 to FIG. 10, and such modifications or variations also fall within the scope of embodiments of the present application. FIG. 11 is described from a perspective of interaction between the first node and the second node.

Referring to FIG. 11, in Step S1110, a first node receives first information transmitted by a second node.

In Step S1120, the first node determines a first mapping order. For example, the first node may determine, based on the first information, an SSB-to-RO mapping relationship within a time period X.

In Step S1130, the first node receives second information transmitted by the second node. The second information may indicate a value of Nr.

In Step S1140, the first node determines a plurality of candidate RO sets within a first period. For example, the first node may determine the plurality of candidate RO sets within the time period X based on a parameter of an SSB, the SSB-to-RO mapping relationship, and Nr that are received.

In Step S1150, the first node receives first signalling transmitted by the second node. The first signalling includes a first PRACH mask index.

In Step S1160, the second node determines a start RO in a first RO set and the first RO set based on whether a first time offset is configured. For example, the first node determines the start RO in the first RO set based on whether the first time offset is configured and a value configured for the first time offset. A configuration status of the first time offset may be used, together with a quantity of SSBs, a first SSB index, and the first PRACH mask index to determine the start RO. Further, the first node determines, based on the SSB-to-RO mapping relationship, one or more RO(s) following the start RO in the first RO set, so as to determine the first RO set.

In Step S1170, the first node transmits a first PRACH transmission to the second node. The first node may perform the first PRACH transmission with a plurality of preamble repetitions on the first RO set.

In Step S1180, the first node monitors a random access response (RAR) in an RAR time window. After receiving an RAR corresponding to the first PRACH transmission, the first node may perform a subsequent random access procedure.

The method embodiments of the present application are described in detail above with reference to FIG. 1 to FIG. 11. Apparatus embodiments of the present application are described in detail below with reference to FIG. 12 to FIG. 15. It should be understood that the description of the method embodiments corresponds to the description of the apparatus embodiments, and therefore, for a part that is not described in detail, reference may be made to the foregoing method embodiments.

FIG. 12 shows a first node used for wireless communication according to an embodiment of the present application. As shown in FIG. 12, the first node 1200 includes a first transceiver 1210.

The first transceiver 1210 may be configured to transmit a first PRACH transmission on a first RO set, where the first RO set includes Nr ROs, the first PRACH transmission includes Nr preamble repetitions, and the Nr ROs in the first RO set are consecutive in time. A first SSB index is one of a plurality of SSB indexes. The Nr ROs in the first RO set are associated with the first SSB index. The first RO set is one of a plurality of RO sets. The plurality of RO sets correspond to a same frequency resource index. Each RO set in the plurality of RO sets includes Nr ROs. A first time offset is a time offset between each two successive RO sets in the plurality of RO sets. The first time offset includes a positive integer quantity of ROs. Whether the first time offset is configured is used for determining a start RO in the first RO set.

In an embodiment, a first period includes a plurality of candidate ROs. Each RO in the plurality of RO sets belongs to the plurality of candidate ROs within the first period. An index of the start RO in the first RO set is an index of the start RO, in the first RO set, in the plurality of candidate ROs within the first period. Whether the first time offset is configured is used for determining the index of the start RO in the first RO set.

In an embodiment, when the first time offset is configured, the index of the start RO in the first RO set is related to all of a quantity of ROs included in the first time offset, a quantity of the plurality of SSB indexes, the first SSB index, and Nr. When the first time offset is not configured, the index of the start RO in the first RO set is related to all of a quantity of the plurality of SSB indexes, the first SSB index, and Nr.

In an embodiment, a first period includes a plurality of candidate RO sets, and each RO set in the plurality of RO sets is one of the plurality of candidate RO sets. Whether the first time offset is configured is used for determining an index of the first RO set in the plurality of candidate RO sets.

In an embodiment, when the first time offset is configured, the index of the first RO set in the plurality of candidate RO sets is related to all of a quantity of ROs included in the first time offset, a quantity of the plurality of SSB indexes, the first SSB index, and Nr. When the first time offset is not configured, the index of the first RO set in the plurality of candidate RO sets is related to all of a quantity of the plurality of SSB indexes, the first SSB index, and Nr.

In an embodiment, the first transceiver 1210 is further configured to receive first signalling. The first signalling includes a first PRACH mask index. When the first time offset is configured, the start RO in the first RO set is related to both the first time offset and the first PRACH mask index. When the first time offset is not configured, the start RO in the first RO set is related to the first PRACH mask index.

In an embodiment, the first transceiver 1210 is further configured to receive a first SSB. The first SSB is one of a plurality of SSBs included in a first SSB set. The plurality of SSBs are in one-to-one correspondence with the plurality of SSB indexes. The first SSB index is an index of the first SSB in the plurality of SSBs included in the first SSB set. A first mapping order is used for mapping the plurality of SSB indexes to a plurality of candidate ROs within a first period.

In an embodiment, the first transceiver 1210 is further configured to receive first information, where the first information is used for indicating a quantity of SSB indexes associated with one RO and a quantity of preambles corresponding to each SSB index of each RO. The first information and a first mapping order are used for determining a plurality of candidate ROs, to which the plurality of SSB indexes are mapped, within a first period.

In an embodiment, the first transceiver 1210 is further configured to receive second information, where the second information includes Nr, and Nr is one of 2, 4, and 8.

Figure 14:
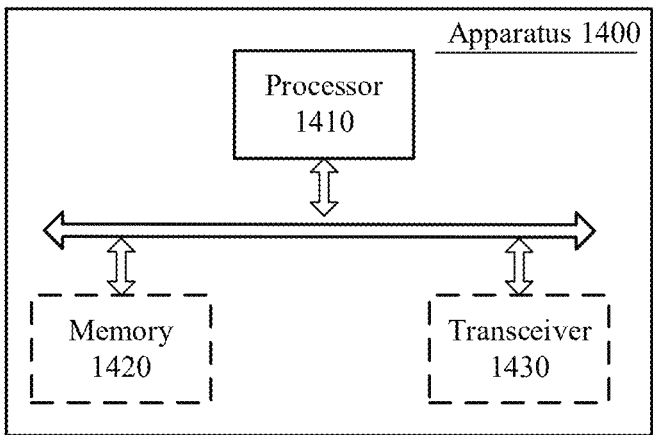
FIG. 14 is a schematic structural diagram of an apparatus according to an embodiment of the present application.

In an embodiment, the first transceiver 1210 may be a transceiver 1430. The first node 1200 may further include a processor 1410 and a memory 1420. Details are shown in FIG. 14.

Figure 13:
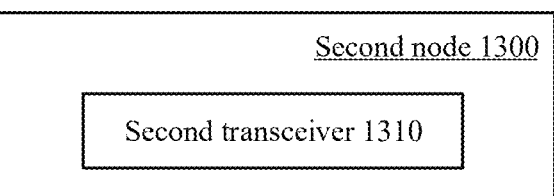
FIG. 13 is a schematic structural diagram of a second node used for wireless communication according to an embodiment of the present application.

FIG. 13 shows a second node used for wireless communication according to an embodiment of the present application. As shown in FIG. 13, the second node 1300 includes a second transceiver 1310.

The second transceiver 1310 may be configured to receive a first PRACH transmission on a first RO set, where the first RO set includes Nr ROs, the first PRACH transmission includes Nr preamble repetitions, and the Nr ROs in the first RO set are consecutive in time. A first SSB index is one of a plurality of SSB indexes. The Nr ROs in the first RO set are associated with the first SSB index. The first RO set is one of a plurality of RO sets. The plurality of RO sets correspond to a same frequency resource index. Each RO set in the plurality of RO sets includes Nr ROs. A first time offset is a time offset between each two successive RO sets in the plurality of RO sets. The first time offset includes a positive integer quantity of ROs. Whether the first time offset is configured is used for determining a start RO in the first RO set.

In an embodiment, a first period includes a plurality of candidate ROs. Each RO in the plurality of RO sets belongs to the plurality of candidate ROs within the first period. An index of the start RO in the first RO set is an index of the start RO, in the first RO set, in the plurality of candidate ROs within the first period. Whether the first time offset is configured is used for determining the index of the start RO in the first RO set.

In an embodiment, when the first time offset is configured, the index of the start RO in the first RO set is related to all of a quantity of ROs included in the first time offset, a quantity of the plurality of SSB indexes, the first SSB index, and Nr. When the first time offset is not configured, the index of the start RO in the first RO set is related to all of a quantity of the plurality of SSB indexes, the first SSB index, and Nr.

In an embodiment, a first period includes a plurality of candidate RO sets, and each RO set in the plurality of RO sets is one of the plurality of candidate RO sets. Whether the first time offset is configured is used for determining an index of the first RO set in the plurality of candidate RO sets.

In an embodiment, when the first time offset is configured, the index of the first RO set in the plurality of candidate RO sets is related to all of a quantity of ROs included in the first time offset, a quantity of the plurality of SSB indexes, the first SSB index, and Nr. When the first time offset is not configured, the index of the first RO set in the plurality of candidate RO sets is related to all of a quantity of the plurality of SSB indexes, the first SSB index, and Nr.

In an embodiment, the second transceiver 1310 is further configured to transmit first signalling. The first signalling includes a first PRACH mask index. When the first time offset is configured, the start RO in the first RO set is related to both the first time offset and the first PRACH mask index. When the first time offset is not configured, the start RO in the first RO set is related to the first PRACH mask index.

In an embodiment, the second transceiver 1310 is further configured to transmit a first SSB. The first SSB is one of a plurality of SSBs included in a first SSB set. The plurality of SSBs are in one-to-one correspondence with the plurality of SSB indexes. The first SSB index is an index of the first SSB in the plurality of SSBs included in the first SSB set. A first mapping order is used for mapping the plurality of SSB indexes to a plurality of candidate ROs within a first period.

In an embodiment, the second transceiver 1310 is further configured to transmit first information, where the first information is used for indicating a quantity of SSB indexes associated with one RO and a quantity of preambles corresponding to each SSB index of each RO. The first information and a first mapping order are used for determining a plurality of candidate ROs, to which the plurality of SSB indexes are mapped, within a first period.

In an embodiment, the second transceiver 1310 is further configured to transmit second information, where the second information includes Nr, and Nr is one of 2, 4, and 8.

In an embodiment, the second transceiver 1310 may be a transceiver 1430. The second node 1300 may further include a processor 1410 and a memory 1420. Details are shown in FIG. 14.

FIG. 14 is a schematic structural diagram of a communications apparatus according to an embodiment of the present application. The dashed lines in FIG. 14 indicate that a unit or a module is optional. The apparatus 1400 may be configured to implement the method described in the foregoing method embodiments. The apparatus 1400 may be a chip, a user equipment, or a network device.

The apparatus 1400 may include one or more processors 1410. The processor 1410 may allow the apparatus 1400 to implement the method described in the foregoing method embodiments. The processor 1410 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 1400 may further include one or more memories 1420. The memory 1420 stores a program. The program is executable by the processor 1410, to cause the processor 1410 to execute the method described in the foregoing method embodiments. The memory 1420 may be separate from the processor 1410 or may be integrated into the processor 1410.

The apparatus 1400 may further include a transceiver 1430. The processor 1410 may communicate with another device or chip by using the transceiver 1430. For example, the processor 1410 may transmit data to and receive data from another device or chip by using the transceiver 1430.

Figure 15:
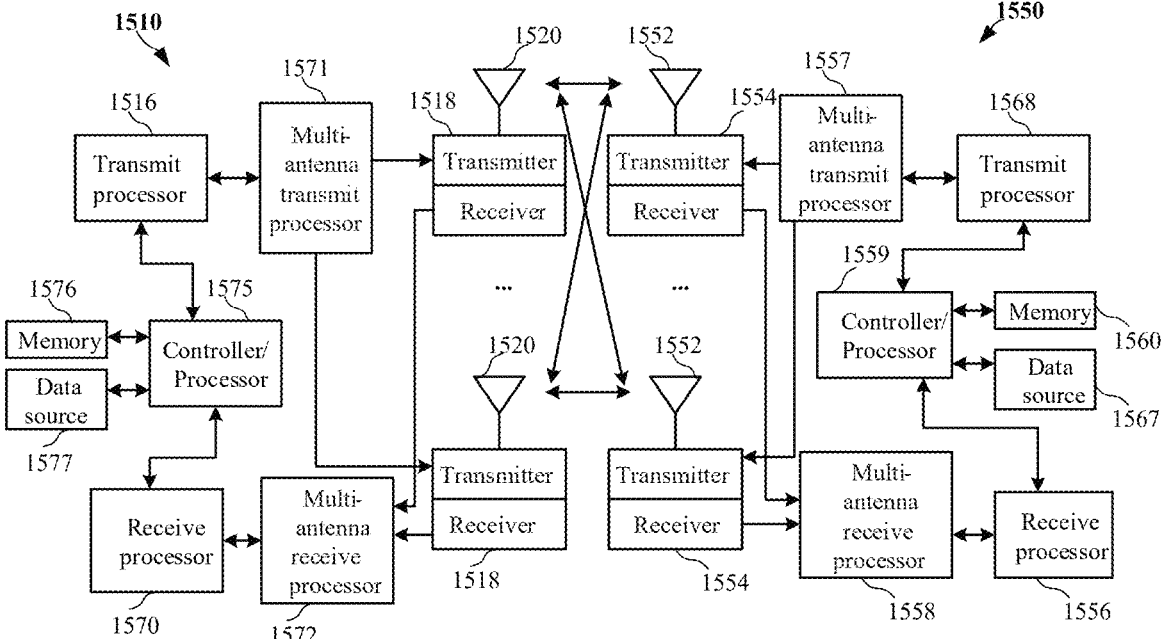
FIG. 15 is a schematic diagram of a hardware module of a communications device according to an embodiment of the present application.

FIG. 15 is a schematic diagram of a hardware module of a communications device according to an embodiment of the present application. Specifically, FIG. 15 is a block diagram of a first communications device 1550 and a second communications device 1510 communicating with each other in an access network.

The first communications device 1550 includes a controller/processor 1559, a memory 1560, a data source 1567, a transmit processor 1568, a receive processor 1556, a multi-antenna transmit processor 1557, a multi-antenna receive processor 1558, a transmitter/receiver 1554, and an antenna 1552.

The second communications device 1510 includes a controller/processor 1575, a memory 1576, a data source 1577, a receive processor 1570, a transmit processor 1516, a multi-antenna receive processor 1572, a multi-antenna transmit processor 1571, a transmitter/receiver 1518, and an antenna 1520.

During transmission from the second communications device 1510 to the first communications device 1550, at the second communications device 1510, an upper layer data packet from a core network or an upper layer data packet from the data source 1577 is provided to the controller/processor 1575. The core network and the data source 1577 represent all protocol layers above an L2 layer. The controller/processor 1575 implements functions of the L2 layer. During transmission from the second communications device 1510 to the first communications device 1550, the controller/processor 1575 provides header compression, encryption, packet segmentation and reordering, multiplexing between a logical channel and a transport channel, and allocation of radio resources of the first communications device 1550 based on various priority measurements. The controller/processor 1575 is further responsible for retransmission of a lost packet, and signalling to the first communications device 1550. The transmit processor 1516 and the multi-antenna transmit processor 1571 implement various signal processing functions of an L1 layer (namely, a physical layer). The transmit processor 1516 implements encoding and interleaving to facilitate forward error correction at the second communications device 1510, and mapping of signal clusters based on various modulation schemes (such as binary phase shift keying, quadrature phase shift keying, M-phase shift keying, and M-quadrature amplitude modulation). The multi-antenna transmit processor 1571 performs digital space precoding, including codebook-based precoding and non-codebook-based precoding, on a coded and modulated symbol, and beamforming processing, to generate one or more spatial streams. The transmit processor 1516 then maps each spatial stream to a subcarrier, multiplexes the mapped spatial stream with a reference signal (for example, a pilot) in time domain and/or frequency domain, and then generates a physical channel that carries a time multi-carrier symbol stream using an inverse fast Fourier transform. Subsequently, the multi-antenna transmit processor 1571 performs an operation of analog precoding transmitting/beamforming on the time multi-carrier symbol stream. Each transmitter 1518 converts a baseband multi-carrier symbol stream provided by the multi-antenna transmit processor 1571 into a radio frequency stream, and then provides the radio frequency stream for different antennas 1520.

During transmission from the second communications device 1510 to the first communications device 1550, at the first communications device 1550, each receiver 1554 receives a signal through a corresponding antenna 1552 of the receiver. Each receiver 1554 recovers information modulated onto a radio frequency carrier, converts a radio frequency stream into a baseband multi-carrier symbol stream, and provides the baseband multi-carrier symbol stream for the receive processor 1556. The receive processor 1556 and the multi-antenna receive processor 1558 implement various signal processing functions of the L1 layer. The multi-antenna receive processor 1558 performs an operation of analog precoding receiving/beamforming on the baseband multi-carrier symbol stream from the receiver 1554. The receive processor 1556 converts, from time domain to frequency domain using fast Fourier transform, the baseband multi-carrier symbol stream obtained through the operation of analog precoding receiving/beamforming. In frequency domain, a physical-layer data signal and a reference signal are demultiplexed by the receive processor 1556. The reference signal is used for channel estimation; and the data signal, after being subjected to multi-antenna detection in the multi-antenna receive processor 1558, is recovered to obtain any spatial stream that is destined for the first communications device 1550. Symbols on each spatial stream are demodulated and recovered in the receive processor 1556, and a soft decision is generated. The receive processor 1556 then decodes and de-interleaves the soft decision to recover upper layer data and a control signal transmitted by the second communications device 1510 on a physical channel. The upper layer data and the control signal are then provided to the controller/processor 1559. The controller/processor 1559 implements functions of the L2 layer. The controller/processor 1559 may be associated with a memory 1560 that stores program codes and data. The memory 1560 may be referred to as a computer-readable medium. During transmission from the second communications device 1510 to the first communications device 1550, the controller/processor 1559 provides demultiplexing between a transport channel and a logical channel, packet reassembly, decryption, header decompression, and control signal processing, to recover an upper layer data packet from the second communications device 1510. The upper layer data packet is then provided to all protocol layers above the L2 layer. Alternatively, various control signals may be provided to the L3 layer for processing by the L3 layer.

During transmission from the first communications device 1550 to the second communications device 1510, at the first communications device 1550, an upper layer data packet is provided to the controller/processor 1559 by using the data source 1567. The data source 1567 represents all protocol layers above the L2 layer. Similar to the transmit function, at the second communications device 1510, described during the transmission from the second communications device 1510 to the first communications device 1550, the controller/processor 1559 implements header compression, encryption, packet segmentation and reordering, and multiplexing between a logical channel and a transport channel, to implement an L2 layer function for a user plane and a control plane. The controller/processor 1559 is further responsible for retransmission of a lost packet, and signaling to the second communications device 1510. The transmit processor 1568 performs modulation mapping and channel coding processing, and the multi-antenna transmit processor 1557 performs digital multi-antenna spatial precoding, including codebook-based precoding and non-codebook-based precoding, and beamforming processing. Then the transmit processor 1568 modulates a generated spatial stream into a multi-carrier/single-carrier symbol stream, and the multi-carrier/single-carrier symbol stream, after being subjected to an analog precoding/beamforming operation in the multi-antenna transmit processor 1557, is provided to different antennas 1552 via the transmitter 1554. Each transmitter 1554 first converts a baseband symbol stream provided by the multi-antenna transmit processor 1557 into a radio frequency symbol stream, and then provides the radio frequency symbol stream for the antenna 1552.

During transmission from the first communications device 1550 to the second communications device 1510, a function at the second communications device 1510 is similar to the receive function, at the first communications device 1550, described during the transmission from the second communications device 1510 to the first communications device 1550. Each receiver 1518 receives a radio frequency signal through a corresponding antenna 1520 of the receiver, converts the received radio frequency signal into a baseband signal, and provides the baseband signal for the multi-antenna receive processor 1572 and the receive processor 1570. The receive processor 1570 and the multi-antenna receive processor 1572 jointly implement functions of the L1 layer. The controller/processor 1575 implements functions of the L2 layer. The controller/processor 1575 may be associated with a memory 1576 that stores program codes and data. The memory 1576 may be referred to as a computer-readable medium. During transmission from the first communications device 1550 to the second communications device 1510, the controller/processor 1575 provides demultiplexing between a transport channel and a logical channel, packet reassembly, decryption, header decompression, and control signal processing, to recover an upper layer data packet from the first communications device 1550. The upper layer data packet from the controller/processor 1575 may be provided to a core network or all protocol layers above the L2 layer, or various control signals may be provided to the core network or the L3 layer for processing by the L3 layer.

In an embodiment, the first communications device 1550 includes least one processor and at least one memory. The at least one memory includes computer program codes. The at least one memory and the computer program codes are configured to be used together with the at least one processor. The first communications device 1550 is at least configured to transmit a first PRACH transmission on a first RO set, where the first RO set includes Nr ROs, the first PRACH transmission includes Nr preamble repetitions, and the Nr ROs in the first RO set are consecutive in time. A first SSB index is one of a plurality of SSB indexes. The Nr ROs in the first RO set are associated with the first SSB index. The first RO set is one of a plurality of RO sets. The plurality of RO sets correspond to a same frequency resource index. Each RO set in the plurality of RO sets includes Nr ROs. A first time offset is a time offset between each two successive RO sets in the plurality of RO sets. The first time offset includes a positive integer quantity of ROs. Whether the first time offset is configured is used for determining a start RO in the first RO set.

In an embodiment, the first communications device 1550 includes: a memory storing a computer-readable instruction program, where the computer-readable instruction program generates an action when being executed by at least one processor, and the action includes: transmitting a first PRACH transmission on a first RO set, where the first RO set includes Nr ROs, the first PRACH transmission includes Nr preamble repetitions, and the Nr ROs in the first RO set are consecutive in time. A first SSB index is one of a plurality of SSB indexes. The Nr ROs in the first RO set are associated with the first SSB index. The first RO set is one of a plurality of RO sets. The plurality of RO sets correspond to a same frequency resource index. Each RO set in the plurality of RO sets includes Nr ROs. A first time offset is a time offset between each two successive RO sets in the plurality of RO sets. The first time offset includes a positive integer quantity of ROs. Whether the first time offset is configured is used for determining a start RO in the first RO set.

In an embodiment, the first communications device 1550 corresponds to the first node in the present application.

In an embodiment, the second communications device 1510 corresponds to the second node in the present application.

In an embodiment, the first communications device 1550 is a user equipment, and the user equipment may serve as a relay node.

In an embodiment, the first communications device 1550 is a user equipment supporting V2X, and the user equipment may serve as a relay node.

In an embodiment, the first communications device 1550 is a user equipment supporting D2D, and the user equipment may serve as a relay node.

In an embodiment, the first communications device 1550 is a network-controlled repeater NCR.

In an embodiment, the first communications device 1550 is a relay wireless repeater.

In an embodiment, the first communications device 1550 is a relay.

In an embodiment, the second communications device 1510 is a base station.

In an embodiment, the antenna 1552, the transmitter 1554, the multi-antenna transmit processor 1557, the transmit processor 1568, and the controller/processor 1559 are configured to transmit a first PRACH transmission on a first RO set.

In an embodiment, the antenna 1520, the receiver 1518, the multi-antenna receive processor 1572, the receive processor 1570, and the controller/processor 1575 are configured to receive the first PRACH transmission on the first RO set.

An embodiment of the present application further provides a computer-readable storage medium for storing a program. The computer-readable storage medium may be applied to the terminal or the network device provided in embodiments of the present application, and the program causes a computer to execute the method performed by the terminal or the network device in various embodiments of the present application.

An embodiment of the present application further provides a computer program product. The computer program product includes a program. The computer program product may be applied to the terminal or the network device provided in embodiments of the present application, and the program causes a computer to execute the method performed by the terminal or the network device in various embodiments of the present application.

An embodiment of the present application further provides a computer program. The computer program may be applied to the terminal or the network device provided in embodiments of the present application, and the computer program causes a computer to execute the method executed by the terminal or the network device in various embodiments of the present application.

It should be understood that the terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include" and "have" and any variations thereof are intended to cover a non-exclusive inclusion.

In embodiments of the present application, the "indication" mentioned may be a direct indication or an indirect indication, or indicate an association. For example, if A indicates B, it may mean that A directly indicates B, for example, B may be obtained from A. Alternatively, it may mean that A indirectly indicates B, for example, A indicates C, and B may be obtained from C. Alternatively, it may mean that there is an association relationship between A and B.

In embodiments of the present application, "B corresponding to A" means that B is associated with A, and B may be determined based on A. However, it should be further understood that, determining B based on A does not mean determining B based only on A, but instead, B may be determined based on A and/or other information.

In embodiments of the present application, the term "correspond" may mean that there is a direct or indirect correspondence between the two, or may mean that there is an association relationship between the two, or may mean that there is a relationship such as indicating and being indicated, or configuring and being configured.

In embodiments of the present application, the "predefined" or "preconfigured" may be implemented in a manner in which corresponding codes, a table, or other related information that may be used for indication is pre-stored in a device (for example, including a user equipment and a network device). A specific implementation thereof is not limited in the present application. For example, predefined may refer to being defined in a protocol.

In embodiments of the present application, the "protocol" may refer to a standard protocol in the communications field, and may include, for example, an LTE protocol, an NR protocol, and a related protocol applied to a future communications system, which is not limited in the present application.

In embodiments of the present application, the term "and/or" is merely an association relationship that describes associated objects, and represents that there may be three relationships. For example, A and/or B may represent three cases: only A exists, both A and B exist, and only B exists. In addition, the character "/" in the specification generally indicates an "or" relationship between the associated objects.

In embodiments of the present application, sequence numbers of the foregoing processes do not mean execution sequences. The execution sequences of the processes should be determined according to functions and internal logic of the processes, and should not be construed as any limitation on the implementation processes of embodiments of the present application.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate, and parts displayed as units may or may not be physical units, and may be at one location, or may be distributed on a plurality of network elements. Some or all of the units may be selected according to actual requirements to achieve the objective of the solutions of embodiments.

In addition, functional units in embodiments of the present application may be integrated into one processing unit, or each of the units may exist alone physically, or two or more units may be integrated into one unit.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, the procedures or functions according to embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (for example, through a coaxial cable, an optical fiber, and a digital subscriber line (DSL)) manner or a wireless (for example, infrared, radio, and microwave) manner. The computer-readable storage medium may be any usable medium readable by the computer, or a data storage device, such as a server or a data center, integrated with one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

A person of ordinary skill in the art may understand that all or some of the steps in the foregoing method may be completed by a program to instruct related hardware. The program may be stored in a computer-readable storage medium, such as a read-only memory, a hard disk, or an optical disk. Optionally, all or some of the steps in the foregoing embodiments may alternatively be implemented by using one or more integrated circuits. Correspondingly, each module unit in the foregoing embodiments may be implemented in a form of hardware, or may be implemented in a form of a software function module. The present application is not limited to a combination of any specific form of software and hardware. The first node in the present application includes but is not limited to: a mobile phone, a tablet computer, a notebook computer, a network interface card, a low-power device, an enhanced machine-type communication (eMTC) device, a narrow band internet of things (NB-IoT) device, a vehicle-mounted communications device, an aircraft, an airplane, a drone, a radio-controlled aircraft, and other wireless communications devices. The second node in the present application includes but is not limited to a mobile phone, a tablet computer, a notebook computer, a network interface card, a low-power device, an eMTC device, an NB-IoT device, a vehicle-mounted communications device, an aircraft, an airplane, a drone, a radio-controlled aircraft, and other wireless communications devices. The user equipment or the UE or the terminal in the present application includes but is not limited to a mobile phone, a tablet computer, a notebook computer, a network interface card, a low-power device, an eMTC device, an NB-IoT device, a vehicle-mounted communications device, an aircraft, an airplane, a drone, a radio-controlled aircraft, and other wireless communications devices. The base station device or the base station or the network-side device in the present application includes but is not limited to a macro cellular base station, a micro cellular base station, a home base station, a relay base station, an eNB, a gNB, a TRP, a global navigation satellite system (GNSS), a relay satellite, a satellite base station, an air base station, and other wireless communications devices.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method, comprising:

transmitting a first physical random access channel (PRACH) transmission on a first PRACH occasion (RO) set, wherein the first RO set comprises Nr ROs, the first PRACH transmission comprises Nr preamble repetitions, the Nr ROs in the first RO set are consecutive in time, a first synchronization signal/physical broadcast channel block (SSB) index is one of a plurality of SSB indexes, the Nr ROs in the first RO set are associated with the first SSB index, the first RO set is one of a plurality of RO sets, the plurality of RO sets correspond to a same frequency resource index, and the plurality of RO sets are associated with a same SSB index, each RO set in the plurality of RO sets comprises Nr ROs, a first time offset is a time offset between each two successive RO sets in the plurality of RO sets associated with the same SSB index, and the first time offset comprises a positive integer quantity of ROs, wherein Nr is an integer; and determining a start RO in the first RO set based at least in part on whether the first time offset is configured.

2. The method according to claim 1, wherein a first period comprises a plurality of candidate ROs, each RO in the plurality of RO sets belongs to the plurality of candidate ROs within the first period, and an index of the start RO in the first RO set is an index of the start RO, in the first RO set, in the plurality of candidate ROs within the first period; and wherein the determining the start RO in the first RO set based at least in part on whether the first time offset is configured comprises determining the index of the start RO in the first RO set based at least in part on whether the first time offset.

3. The method according to claim 2, wherein when the first time offset is configured, the index of the start RO in the first RO set is related to a quantity of ROs comprised in the first time offset, a quantity of the plurality of SSB indexes, the first SSB index, and Nr; or when the first time offset is not configured, the index of the start RO in the first RO set is related to a quantity of the plurality of SSB indexes, the first SSB index, and Nr.

4. The method according to claim 1, wherein a first period comprises a plurality of candidate RO sets, and each RO set in the plurality of RO sets is one of the plurality of candidate RO sets; and wherein the determining the start RO in the first RO set based at least in part on whether the first time offset is configured comprises determining the index of the start RO in the first RO set based at least in part on whether the first time offset.

5. The method according to claim 4, wherein when the first time offset is configured, the index of the first RO set in the plurality of candidate RO sets is related to a quantity of ROs comprised in the first time offset, a quantity of the plurality of SSB indexes, the first SSB index, and Nr; or when the first time offset is not configured, the index of the first RO set in the plurality of candidate RO sets is related to a quantity of the plurality of SSB indexes, the first SSB index, and Nr.

6. The method according to claim 1, wherein the method further comprises:

receiving first signalling, wherein the first signalling comprises a first PRACH mask index, wherein when the first time offset is configured, the start RO in the first RO set is related to both the first time offset and the first PRACH mask index; or when the first time offset is not configured, the start RO in the first RO set is related to the first PRACH mask index.

7. The method according to claim 1, wherein the method further comprises:

receiving a first SSB, wherein the first SSB is one of a plurality of SSBs comprised in a first SSB set, the plurality of SSBs are in one-to-one correspondence with the plurality of SSB indexes, and the first SSB index is an index of the first SSB in the plurality of SSBs comprised in the first SSB set; and a first mapping order is used for mapping the plurality of SSB indexes to a plurality of candidate ROs within a first period.

8. The method according to claim 1, wherein the method further comprises:

receiving first information, wherein the first information indicates a quantity of SSB indexes associated with one RO and a quantity of preambles corresponding to each SSB index of each RO, and the first information and a first mapping order are used for determining a plurality of candidate ROs, to which the plurality of SSB indexes are mapped, within a first period.

9. The method according to claim 1, wherein the method further comprises:

receiving second information, wherein the second information comprises Nr, and Nr is one of 2, 4, and 8.

10. A method, comprising:

receiving a first physical random access channel (PRACH) transmission on a first PRACH occasion (RO) set, wherein the first RO set comprises Nr ROs, the first PRACH transmission comprises Nr preamble repetitions, the Nr ROs in the first RO set are consecutive in time, a first synchronization signal/physical broadcast channel block (SSB) index is one of a plurality of SSB indexes, the Nr ROs in the first RO set are associated with the first SSB index, the first RO set is one of a plurality of RO sets, the plurality of RO sets correspond to a same frequency resource index, and the plurality of RO sets are associated with a same SSB index, each RO set in the plurality of RO sets comprises Nr ROs, a first time offset is a time offset between each two successive RO sets in the plurality of RO sets associated with the same SSB index, and the first time offset comprises a positive integer quantity of ROs, and whether the first time offset is configured is associated with a start RO in the first RO set.

11. The method according to claim 10, wherein a first period comprises a plurality of candidate ROs, each RO in the plurality of RO sets belongs to the plurality of candidate ROs within the first period, and an index of the start RO in the first RO set is an index of the start RO, in the first RO set, in the plurality of candidate ROs within the first period, and whether the first time offset is configured is associated with the index of the start RO in the first RO set.

12. The method according to claim 11, wherein when the first time offset is configured, the index of the start RO in the first RO set is related to a quantity of ROs comprised in the first time offset, a quantity of the plurality of SSB indexes, the first SSB index, and Nr; or when the first time offset is not configured, the index of the start RO in the first RO set is related to a quantity of the plurality of SSB indexes, the first SSB index, and Nr.

13. The method according to claim 10, wherein a first period comprises a plurality of candidate RO sets, and each RO set in the plurality of RO sets is one of the plurality of candidate RO sets, and whether the first time offset is configured is associated with an index of the first RO set in the plurality of candidate RO sets.

14. The method according to claim 13, wherein when the first time offset is configured, the index of the first RO set in the plurality of candidate RO sets is related to a quantity of ROs comprised in the first time offset, a quantity of the plurality of SSB indexes, the first SSB index, and Nr; or when the first time offset is not configured, the index of the first RO set in the plurality of candidate RO sets is related to a quantity of the plurality of SSB indexes, the first SSB index, and Nr.

15. The method according to claim 10, wherein the method further comprises:

transmitting first signalling, wherein the first signalling comprises a first PRACH mask index, wherein when the first time offset is configured, the start RO in the first RO set is related to both the first time offset and the first PRACH mask index; or when the first time offset is not configured, the start RO in the first RO set is related to the first PRACH mask index.

16. The method according to claim 10, wherein the method further comprises:

transmitting a first SSB, wherein the first SSB is one of a plurality of SSBs comprised in a first SSB set, the plurality of SSBs are in a one-to-one correspondence with the plurality of SSB indexes, and the first SSB index is an index of the first SSB in the plurality of SSBs comprised in the first SSB set; and a first mapping order is used for mapping the plurality of SSB indexes to a plurality of candidate ROs within a first period.

17. The method according to claim 10, wherein the method further comprises:

transmitting first information, wherein the first information indicates a quantity of SSB indexes associated with one RO and a quantity of preambles corresponding to each SSB index of each RO, and the first information and a first mapping order are used for determining a plurality of candidate ROs, to which the plurality of SSB indexes are mapped, within a first period.

18. The method according to claim 10, wherein the method further comprises:

transmitting second information, wherein the second information comprises Nr, and Nr is one of 2, 4, and 8.

19. An apparatus, comprising:

at least one processor;

one or more non-transitory computer-readable storage media coupled to the at least one processor and storing programming instructions for execution by the at least one processor, wherein the programming instructions, when executed, cause the apparatus to perform operations comprising:

transmitting a first physical random access channel (PRACH) transmission on a first PRACH occasion (RO) set, wherein the first RO set comprises Nr ROs, the first PRACH transmission comprises Nr preamble repetitions, the Nr ROs in the first RO set are consecutive in time, a first synchronization signal/physical broadcast channel block (SSB) index is one of a plurality of SSB indexes, the Nr ROs in the first RO set are associated with the first SSB index, the first RO set is one of a plurality of RO sets, the plurality of RO sets correspond to a same frequency resource index, and the plurality of RO sets are associated with a same SSB index, each RO set in the plurality of RO sets comprises Nr ROs, a first time offset is a time offset between each two successive RO sets in the plurality of RO sets associated with the same SSB index, and the first time offset comprises a positive integer quantity of ROs, wherein Nr is an integer; and determining a start RO in the first RO set based at least in part on whether the first time offset is configured.

20. The apparatus according to claim 19, wherein a first period comprises a plurality of candidate ROs, each RO in the plurality of RO sets belongs to the plurality of candidate ROs within the first period, and an index of the start RO in the first RO set is an index of the start RO, in the first RO set, in the plurality of candidate ROs within the first period; and wherein the determining the start RO in the first RO set based at least in part on whether the first time offset is configured comprises determining the index of the start RO in the first RO set based at least in part on whether the first time offset.

* * * * *